United States Patent [19]

Fukui et al.

[11] Patent Number: 5,343,235
[45] Date of Patent: Aug. 30, 1994

[54] APPARATUS AND METHOD FOR FORMING AN IMAGE INCLUDING CORRECTION FOR LASER BEAM SIZE

[75] Inventors: Kazuyuki Fukui, Toyohashi; Takanobu Yamada, Toyokawa, both of Japan

[73] Assignee: Minolta Camera Kabushiki Kaisha, Osaka, Japan

[21] Appl. No.: 671,963

[22] Filed: Mar. 19, 1991

[30] Foreign Application Priority Data

| Mar. 20, 1990 | [JP] | Japan | 2-71405 |
| Mar. 20, 1990 | [JP] | Japan | 2-71406 |
| Mar. 20, 1990 | [JP] | Japan | 2-71407 |
| Mar. 20, 1990 | [JP] | Japan | 71408 |
| Mar. 20, 1990 | [JP] | Japan | 2-71409 |

[51] Int. Cl.$^5$ ............................ G01D 15/14
[52] U.S. Cl. .................... 346/160; 346/108; 355/206; 355/208
[58] Field of Search .............. 346/160, 108; 358/298, 358/457, 458, 459, 1.1, 107 R; 355/35, 208, 206, 214

[56] References Cited

U.S. PATENT DOCUMENTS

| 4,226,525 | 10/1980 | Sakamoto et al. | 355/14 D |
| 4,277,162 | 7/1981 | Kasahara et al. | 355/14 R |
| 4,367,944 | 1/1983 | Kuru | 355/214 |
| 4,583,834 | 4/1986 | Seko et al. | 355/14 C |
| 4,592,646 | 6/1986 | Suzuki et al. | 355/14 R |
| 4,640,603 | 2/1987 | Honma | 355/3 R |
| 4,647,950 | 3/1987 | Nosaki et al. | 346/160 |
| 4,674,861 | 6/1987 | Kawamura | 355/4 |
| 4,679,057 | 7/1987 | Hamada | 346/76 L |
| 4,680,646 | 7/1987 | Ikeda et al. | 358/298 |
| 4,697,910 | 10/1987 | Kasuya | 355/3 R |
| 4,709,250 | 11/1987 | Takeuchi | 346/160 |
| 4,717,964 | 1/1988 | Abe et al. | 358/283 |
| 4,763,199 | 8/1988 | Suzuki | 358/280 |
| 4,800,442 | 1/1989 | Riseman et al. | 358/280 |
| 4,814,886 | 3/1989 | Kuge et al. | 358/293 |
| 4,816,924 | 3/1989 | Sekiya | 358/296 |
| 4,855,766 | 8/1989 | Suzuki | 346/160 |
| 4,864,419 | 9/1989 | Saito et al. | 358/300 |
| 4,873,428 | 10/1989 | Takeuchi et al. | 250/214 DC |
| 4,894,685 | 1/1990 | Shoji | 355/246 |
| 4,903,123 | 2/1990 | Kawamura et al. | 358/75 |
| 4,914,459 | 4/1990 | Mama et al. | 346/160 |
| 4,924,301 | 5/1990 | Surbrook | 358/75 |
| 4,933,776 | 6/1990 | Ikeda | 358/456 |
| 4,943,827 | 7/1990 | Good et al. | 355/30 |
| 4,958,239 | 9/1990 | Yamada et al. | 358/457 |
| 5,153,609 | 10/1992 | Ando et al. | 346/108 |

FOREIGN PATENT DOCUMENTS

| 51-33635 | 3/1976 | Japan . |
| 53-115233 | 10/1978 | Japan . |
| 53-116157 | 10/1978 | Japan . |
| 53-136838 | 11/1978 | Japan . |
| 55-15169 | 2/1980 | Japan . |
| 55-29869 | 3/1980 | Japan . |
| 57-76977 | 5/1982 | Japan . |
| 59-140647 | 8/1984 | Japan . |
| 59-161982 | 9/1984 | Japan . |
| 61-61566 | 3/1986 | Japan . |
| 0094070 | 5/1986 | Japan | 355/3 R |
| 61-94070 | 5/1986 | Japan . |
| 61-118069 | 6/1986 | Japan . |
| 61-214666 | 9/1986 | Japan . |
| 63-296062 | 12/1988 | Japan . |
| 1-196347 | 8/1989 | Japan . |
| 2145598A | 3/1985 | United Kingdom . |

Primary Examiner—Benjamin R Fuller
Assistant Examiner—Randy W. Gibson
Attorney, Agent, or Firm—Burns, Doane, Swecker & Mathis

[57] ABSTRACT

An apparatus and a method for forming an image with use of electrophotographic process, wherein the effect of the diffusion of electrostatic latent image and of beam size is compensated by changing the quantity of light for exposure, a gamma transformation table or a dither threshold value according to the detected value of the surface electric potential of a photoconductor or according to code information put on a support member of the photoconductor.

57 Claims, 36 Drawing Sheets

Fig. 28(c)

| 1 | 1 | 2 | 3 | 4 | 5 | 6 | 7 | 9 | 10 | 12 | 15 | 19 | 22 | 25 | 29 |
|---|---|---|---|---|---|---|---|---|---|---|---|---|---|---|---|
| 1 | 1 | 2 | 4 | 5 | 6 | 7 | 8 | 9 | 11 | 13 | 17 | 20 | 24 | 27 | 32 |

Fig. 28(d)

| 1 | 1 | 1 | 1 | 1 | 1 | 2 | 2 | 3 | 4 | 5 | 8 | 11 | 17 | 25 |
|---|---|---|---|---|---|---|---|---|---|---|---|---|---|---|
| 1 | 1 | 1 | 1 | 1 | 1 | 2 | 2 | 3 | 4 | 6 | 9 | 14 | 20 | 32 |

APPARATUS AND METHOD FOR FORMING AN IMAGE INCLUDING CORRECTION FOR LASER BEAM SIZE

BACKGROUND OF THE INVENTION

1. Field of the Invention

The present invention relates to an apparatus and a method for forming an image with use of electrophotographic process, such as a digital copying machine, a digital printer or the like.

2. Description of Related Art

Various kinds of an apparatus such as a laser printer have been used practically for forming an image with use of electrophotographic process by exposing the photoconductor with a light beam according to image data which have been converted into digital values, while various kinds of methods for forming a digital image have been suggested in order to reproduce a half-tone image such as a picture with high fidelity.

Among such methods are known an area gradation method with use of a dither matrix a multi-level laser exposure method (such as the pulse width modulation method of the light-intensity modulation method) wherein the gradation for a dot to be printed is expressed by the amount of laser light (which is equal to the product of the light-emitting time with the light intensity) by changing the pulse width (light-emitting time) or the light intensity, (refer for example Japanese patents laid-open publication No. 91077/1987, No. 39972/1987, No. 188562/1987 and No. 22597/1986). Further, multi-level dither methods in combination of the dither method with the pulse width modulation method or light intensity modulation method are also known.

It is possible in principle to reproduce an image density with gradation corresponding uniquely to the degree of gradation of image data to be reproduced by using such a method. However, the image density to be reproduced (hereinafter referred to as image density) is not proportional to the density of a document owing to complex factors such as the photosensitive characteristic of the photoconductor, the characteristics of toners and the environment to be used. The nonlinear characteristic which deviates from the linear characteristic to be realized is called the gamma characteristic, generally, or the gradation characteristic, and this nonlinear gamma characteristic is one of the important factors to lower the fidelity of the reproduced image, especially of a half-tone document.

In order to improve the fidelity of the reproduced image, the so-called gamma correction is adopted, so that an image can be reproduced with fidelity according to the amplitude of the document image. In the gamma correction, a document density data to be read is transformed by using a predetermined transformation table for gamma correction, and a digital image is formed according to the transformed document density.

However, in the image reproduction with use of the multi-level laser exposure method or the multi-level dither method, a dot is expressed by an analog method or by using an electrostatic latent image on the photoconductor. Therefore, the gamma characteristic depends largely on the size of laser beam and the diffusion of the latent image. Thus, if the size of the laser beam is changed or the photosensitive characteristic of the photoconductor, especially the latent image diffusion rate, is changed, the gamma characteristic is also changed.

The change of the size of laser beam may happen for example when a print head assembly having a laser diode as a principal part is replaced. The photosensitive characteristic of the photoconductor changed for example due to the scattering of the characteristic in the production process of the photoconductor or the deterioration of the photoconductor itself. Because the gamma correction with use of a single transformation table acts properly to result the linear gradation characteristic only if the gamma characteristic is constant, if the gamma characteristic changes, the gamma correction cannot be performed properly, and an image reproduced with fidelity can not be obtained. Further, the reproducibility of a narrow line is also affected by these problems especially in the light-intensity modulation method.

SUMMARY OF THE INVENTION

An essential object of the present invention is to provide an apparatus and a method for forming a half-tone image with use of electrophotographic process wherein the gradation can be expressed correctly by suppressing the change in the gamma characteristic.

A first apparatus according to the present invention for forming an image with use of electrophotographic process includes essentially exposure means for exposing a photoconductor layer sensitized at a predetermined initial electric potential to form an electrostatic latent image; exposure control means for controlling the quantity of light illuminating the photoconductor layer by the exposure means in correspondence with an image density signal representing the density of each pixel of an image to be formed; and detection means for detecting the surface electric potential of a part of said photoconductor layer exposed at the predetermined quantity of light;

wherein said exposure control means control said exposure means so that said quantity of light is determined on the basis of a maximum quantity of light, gradation correction data or a dither pattern selected according to the detected values with the detection means.

A second apparatus according to the present invention for forming an image with use of electrophotographic process includes essentially exposure means for exposing a electroconductor layer sensitized at a initial electric potential to form an electrostatic latent image; read means for reading code information put on a support member of the electroconductor layer; and change means for changing the maximum quantity of light, gradation correction data, or a dither pattern in correspondence with the code information read by the read means.

A first method according to the present invention for forming an image with use of electrophotographic process by controlling the exposure to a photoconductor according to an image density, includes essentially the steps of: assigning a first code to the degree of broadening of an electrostatic latent image against the size of a laser beam to expose a photoconductor; assigning a second code to the size of the laser beam to expose the photoconductor; determining a maximum laser quantity of light for exposure gamma correction data, or a dither pattern for each combination of the values of the two codes, which maximum quantity of light or the like being most appropriate for correcting the gamma characteristic of an image to be reproduced; selecting the maximum laser intensity in correspondence with the combination of the first and second codes to be inputted; and forming an electrostatic latent image with a laser beam of the size in correspondence with the second code with the selected maximum quantity of light or the like.

An advantage of the present invention is that the effects on the gradation characteristic of a change in laser beam size and/or a change in the diffusion rate owing to the deterioration or replacement of photoconductor or can be suppressed so as get a reproduced image of superior reproduction quality.

Another advantage of the present invention is that the gradation correction can be performed automatically so as to deal surely with photoconductors of different gamma characteristic.

BRIEF DESCRIPTION OF THE DRAWINGS

Further objects advantages of the present invention will be apparent from the following description, reference being had to the accompanying drawings wherein preferred embodiments of the present invention are clearly shown.

In the drawings:

FIG. 28(a), 28(b), 28(c) and 28(d) are diagrams of dither patterns;

DETAILED DESCRIPTION OF THE PREFERRED EMBODIMENT

Figure 1A:
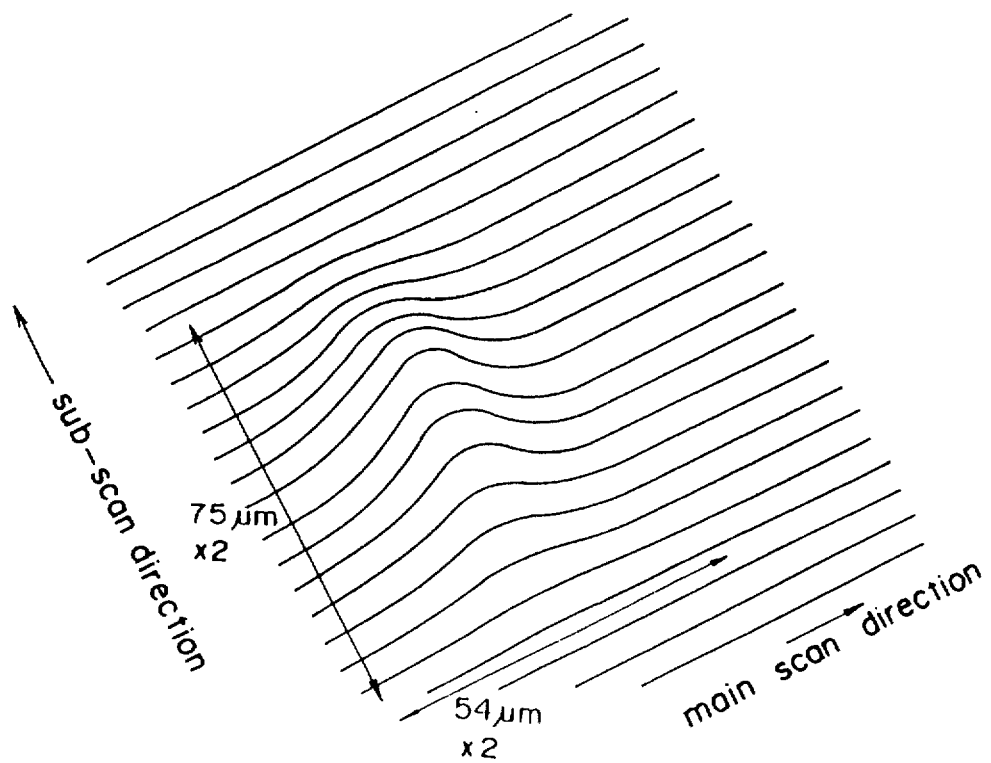
FIGS. 1(a) and 1(b) are diagrams for displaying beams at 1.0 mW of B-type and S-type laser diodes, respectively.

Referring now to the drawings, wherein like numerals in the different views designate like or corresponding parts, preferred embodiments of the present invention will be described below.

(A) gamma characteristic and the size of laser beam and the diffusion rate

In the present invention, the effects of a change in the size of laser beam and/or the diffusion of electrostatic latent image on the gradation characteristic quality are compensated for. Thus, these effects will be explained first by using examples.

Before explaining these effects, multi-level laser exposure methods for expressing a half-tone image are explained. The light-intensity modulation method is one of the multi-level laser exposure methods, wherein the light intensity for a dot is modulated at multi-levels in accordance with a multi-level input signal supplied to a printer or the like while the light-emitting time is kept constant. Therefore, the density of a dot is expressed at multi-levels because the amount of light exposing a dot varies with the multi-level input signal so that the electric potential of electrostatic latent image changes at multi-levels.

The pulse width modulation method is also one of the multi-level laser exposure methods, wherein the light emitting time is modulated in accordance with a multi-level input signal for a dot while the light intensity is kept constant. That is, the area of the electrostatic latent image of a dot is changed at multi-levels in accordance with the input signal.

The multi-level dither method is also a method for expressing a half-tone image by combining the above-mentioned multi-level exposure method and the dither method. In this method, dots of for example (N * M) is dealt as a block, and the density of each dot in the block is expressed at multi-levels, so as to express the gradation of (N * M * L+1) levels. Each dot is expressed at multi-levels by using the light-intensity modulation method or the pulse width modulation method explained above. Thus, an area of (N * M) dots becomes a pixel.

Next, the effect of the size of laser beam on the gamma characteristic is explained.

Figure 1B:
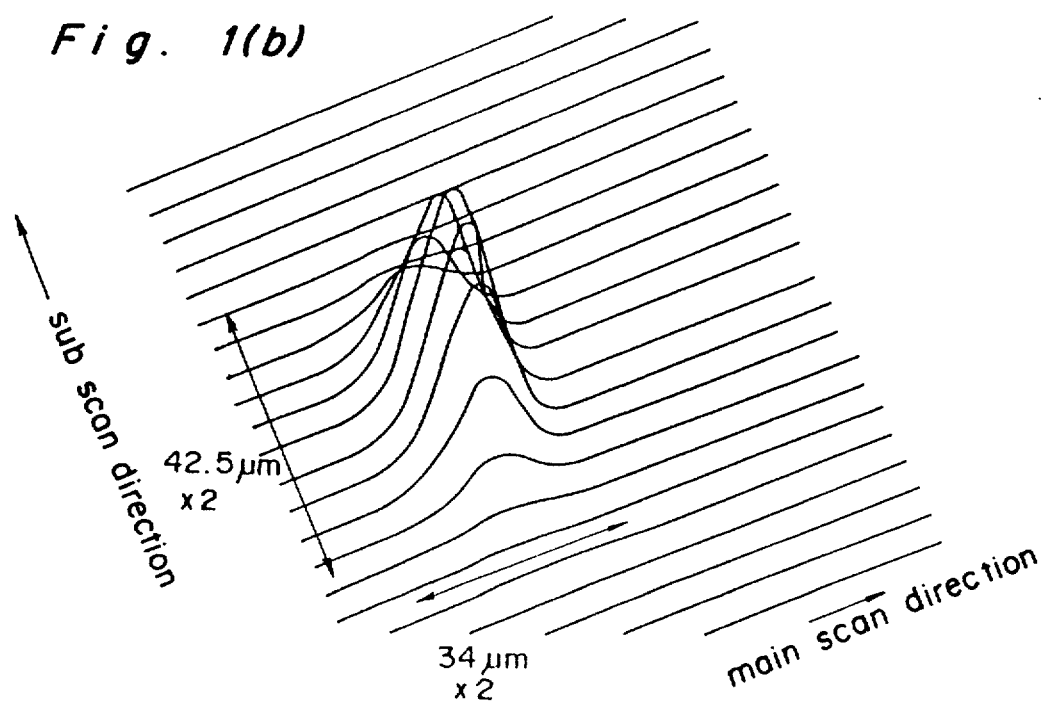
Figure 2A:
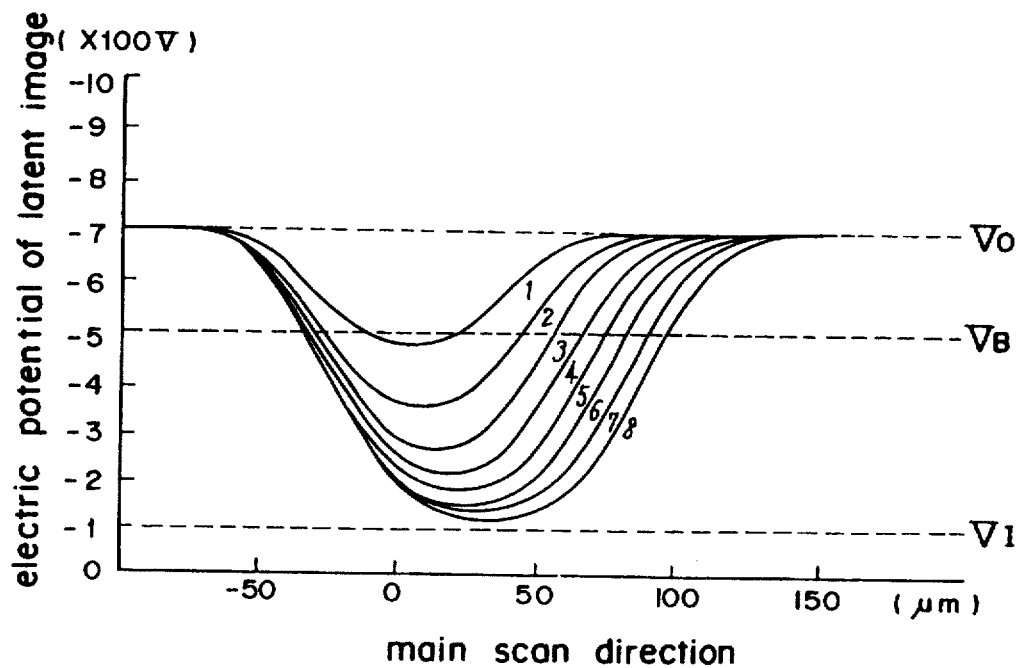
FIGS. 2(a) and 2(b) are graphs of a section of electrostatic latent images formed by laser beams of eight steps of light-emitting time at 1.0 mW with B-type and S-type laser diodes, respectively.
Figure 2B:
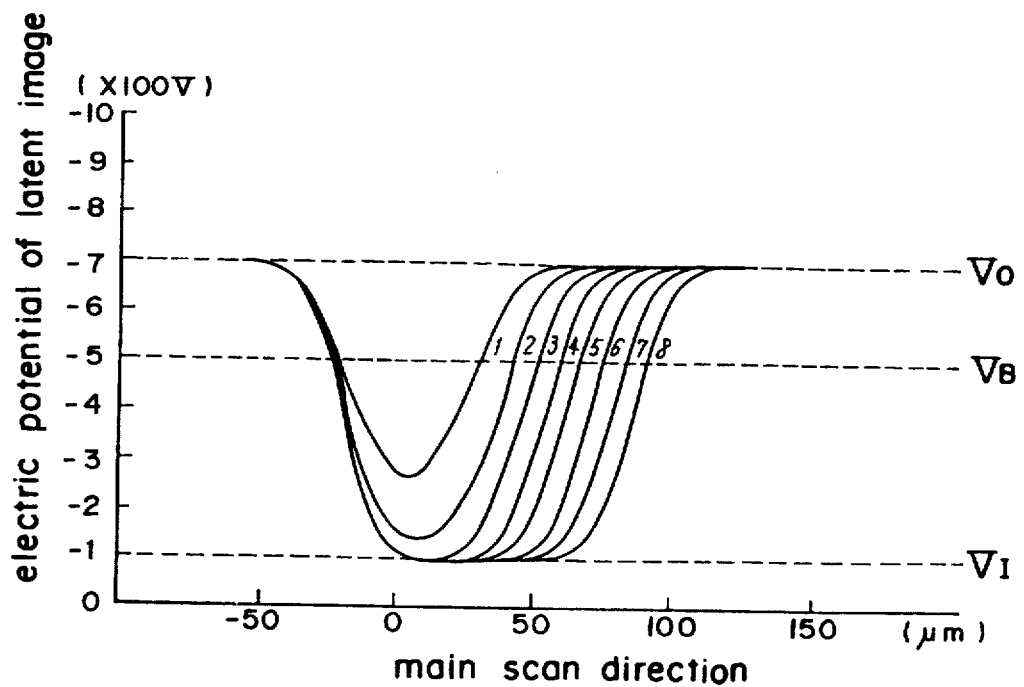

FIGS. 1(a) and 1(b) visualize three-dimensionally the light-intensity distribution of laser beam emitted at 1.0 mW of the light-intensity by a laser diode called as B type having a beam size of 54 μm * 75 μm and by another called as S type having a beam size of 34 μm * 42.5 μm, respectively. The beam size is defined as the radii in the directions of main scan and sub-scan of an area having a value more than $1/e^2$ in relation to the maximum in the gaussian distribution of laser energy. FIGS. 2(a) and 2(b) show the vertical sections in the main scan direction of an electrostatic latent image on the photoconductor formed by using the pulse width modulation method with eight steps of light-emitting time of 50 * (⅛), 50 * (2/8), . . . , 50 * (8/8) (msec), designated by numbers 1–8 in the FIGS., at 1.0 mW of light-intensity with the above-mentioned B type and S type laser diode, respectively. In FIGS. 2(a) and 2(b), $V_0$ designates the surface electric potential of the sensitized photoconductor, $V_B$ the development bias electric voltage, and $V_I$ the decay electric potential when the photoconductor is exposed sufficiently. The main scan direction is the direction along which a laser beam moves, while the subscan direction is the direction along which the photoconductor moves. It is clear that though the two electrostatic latent images shown in FIGS. 2(a) and 2(b) are formed at the same light intensity (1.0 mW) with the B type and S type laser diodes, they are different from each other as to the shape such as the magnitude on depth.

Figure 3:
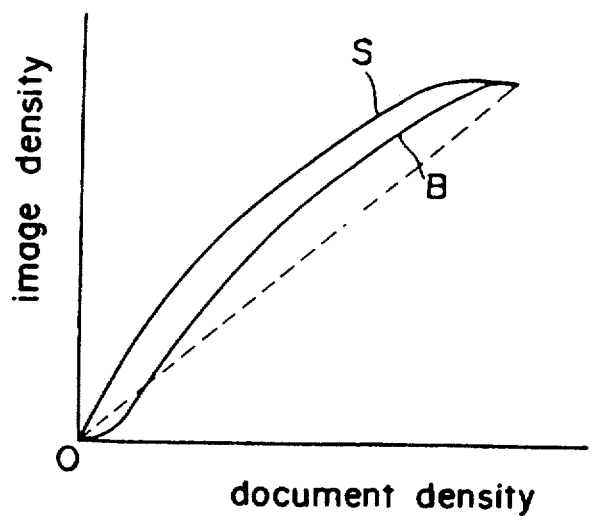
FIG. 3 is a graph showing a change in gamma characteristic caused by a change in the size of laser beam.

FIG. 3 show the two gamma characteristics, designated as B and S obtained by exposing the laser beams of the B and S type laser diodes on the same photoconductor with use of the pulse width modulation method. It is apparent that the gamma characteristic varies with the beam size of the B and S type laser diodes, and this is ascribed to the difference in shape of the electrostatic latent image, as displayed in FIGS. 2(a) and 2(b).

Because the gamma characteristic changes when the beam size is replaced, the gamma correction may not be appropriate if the same gamma correction is performed even after the replacement. Then the gradation characteristic of a reproduced image may change by the replacement of beam size, so that a stabilized reproduction of image cannot be realized.

Next, the effect of the latent image diffusion phenomenon of the photoconductor on the gamma characteristic will be explained below.

A photoconductor to be used in the electrophotographic process is a photoconductor material of a few tens μm thickness deposited or applied to an electroconductive substrate. When a laser beam is exposed in dark on the photoconductor which have been sensitized with charges supplied by corona discharge, the electrical resistance of the electroconductive substrate decreases at the exposed area, wherein the charges are transported to the substrate. Thus, the exposed area is neutralized electrically, so that an electrostatic latent image is formed.

In general, an electrostatic latent image has a contour larger than the actual beam size of the exposure, and the contour becomes dim. This phenomenon is called as latent image diffusion. This phenomenon is caused by the reflection and the scattering of laser beam occurring a little at the photoconductor or the substrate on the exposure so as to form a latent image even around the exposed area. The phenomenon is also caused by the diffusion of the charges on the transport to the substrate owing to the electrical resistance not so infinite in the nonexposed area to average the latent image with respect to time.

Figure 4:
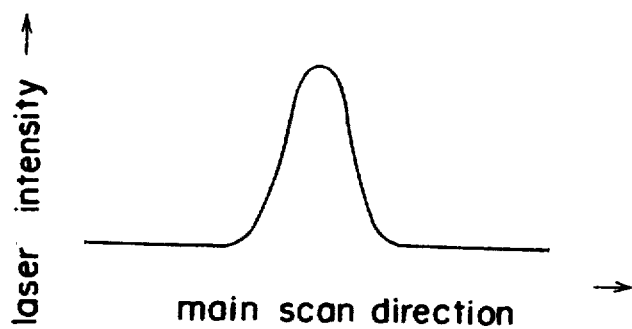
FIG. 4 is a schematic diagram of the distribution of laser intensity.
Figure 5:
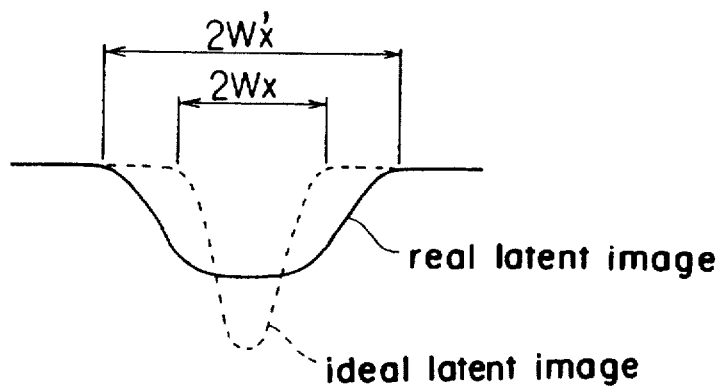
FIG. 5 is a schematic diagram of ideal and real latent images.

FIGS. 4 and 5 show the latent image diffusion phenomena schematically. If a laser beam of the light-intensity distribution shown in FIG. 4 is exposed on the photoconductor, an electrostatic latent image shown by a dashed line in FIG. 5 is formed in correspondence with the light-intensity distribution in an ideal state with no latent image diffusion phenomenon. However, the latent image diffusion phenomenon happens inevitably, so that the size (2 * Wx) of a real latent image, shown by a solid line in FIG. 5, becomes larger than that (2 * Wx') of the ideal latent image. Further, the density of the toners to be adhered decreases with a decrease in the lowering of electrical potential. Thus, a dim toner image is formed.

The latent image diffusion can be regarded substantially as the increase of the size of laser beam. Then, the rate of latent image diffusion, or the diffusion rate α can be defined for example as follows:

$$\alpha = Wx'/Wx \ (=Wy'/Wy),$$

wherein Wx and Wy designate the sizes of the actual laser beam in the main scan direction and in the subscan direction, while Wx' and Wy' designate the sizes of laser beam in the main scan direction and in the subscan direction obtained form the electrostatic latent image distribution of the electrostatic latent image formed by the laser beam.

The diffusion rate α is not constant owing to the scattering of the photoconductor characteristics on the manufacturing process, the deterioration of the photoconductor itself or the like, and the gradation characteristic varies with time.

Figure 6:
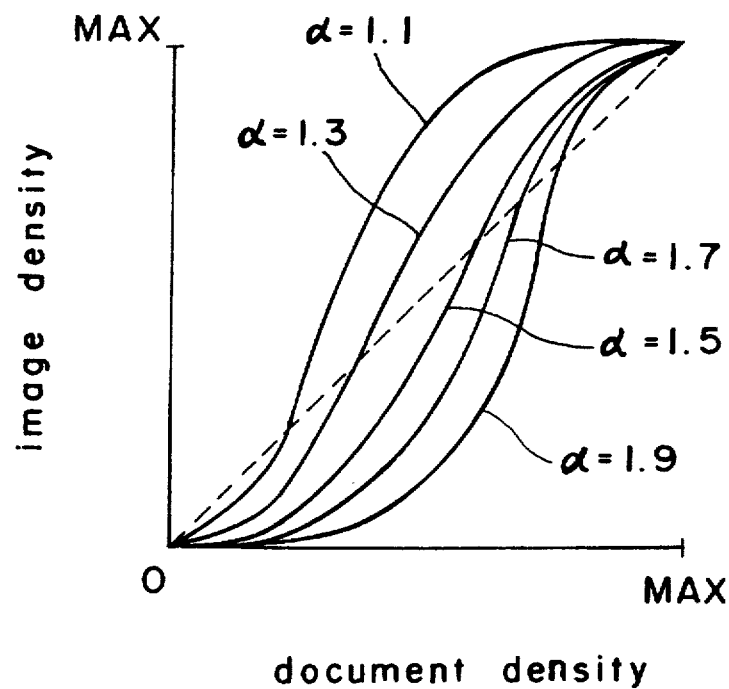
FIG. 6 is a graph of a change in gamma characteristic caused by a change in diffusion rate.

FIG. 6 shows an example of change in the gamma characteristic in the light intensity modulation method owing to a change in the diffusion rate α at five steps of 1.1, 1.3, 1.5, 1.7 and 1.9. It is apparent that the rise rate of the gamma characteristic around the origin becomes milder with increasing diffusion rate α.

Figure 7:
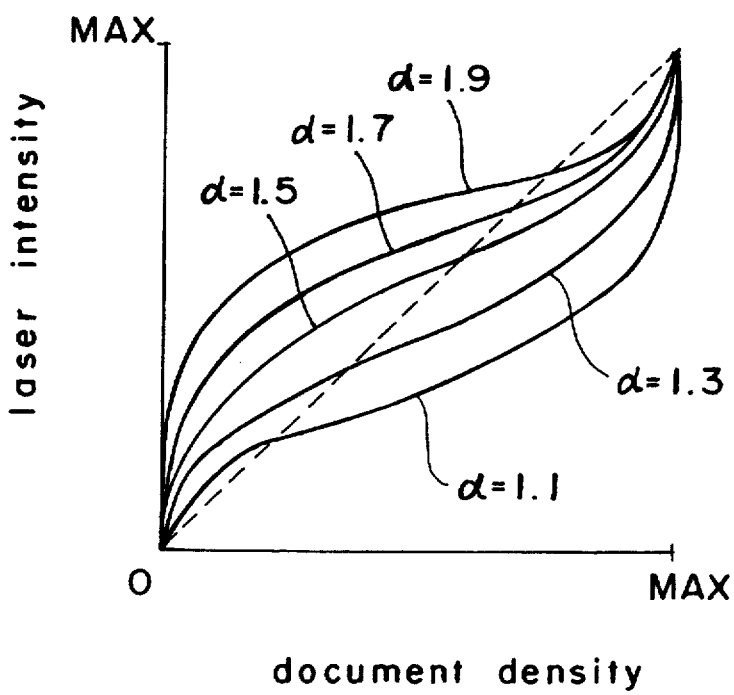
FIG. 7 is a graph of the light-emitting characteristic for different diffusion rates.

FIG. 7 shows the light-emitting characteristic for correcting the gamma characteristic shown in FIG. 6. Previously, the gamma correction for the gamma characteristic responding to a change in the diffusion rate has not been performed, and the gamma correction is carried out only for a specified diffusion rate. For example, even if the diffusion rate changes much, the gamma correction is performed always only by using a transformation table for gamma correction in correspondence with the gamma characteristic of $\alpha = 1.3$. The light-emitting characteristic of a laser according to the transformation table is the curve for $\alpha = 1.3$ in FIG. 7.

Figure 8:
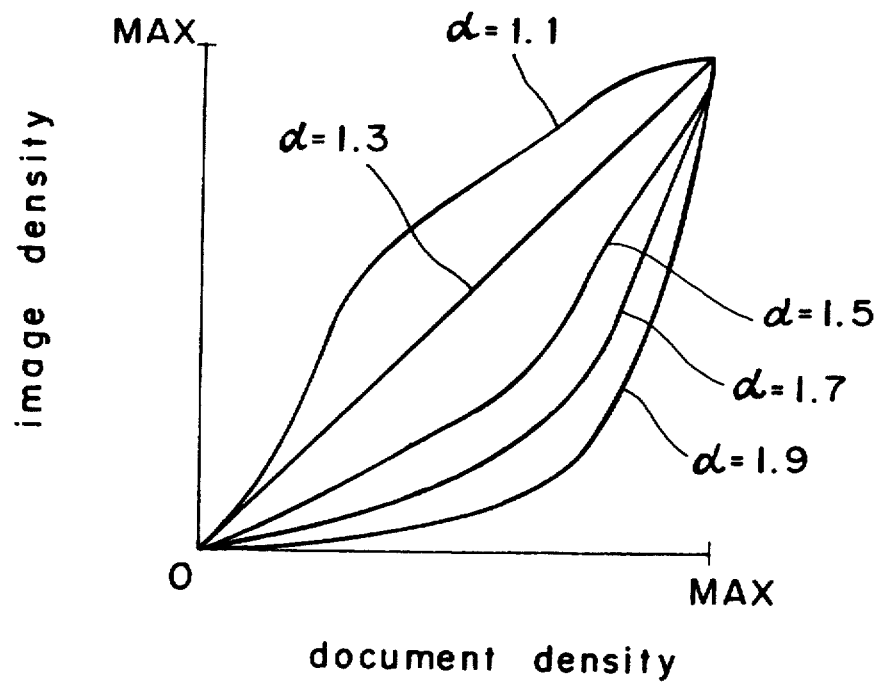
FIG. 8 is a graph of image density with use of the four gamma corrections when a laser diode of the light-emitting characteristic of $\alpha=1.3$ shown in FIG. 7.

FIG. 8 shows the gamma characteristics for the five $\alpha$ values which are corrected by the gamma characteristic at $\alpha = 1.3$. It is clearly shown that the precise gamma correction cannot be performed for the photoconductors except $\alpha = 1.3$ if the same gamma correction is performed irrespectively of a change in $\alpha$. As explained above, the gamma characteristic varies with the diffusion rate $\alpha$, so that the gamma correction cannot be performed appropriately. Thus, the gradation characteristic of a reproduced image changes and the tone of the reproduced image is not stabilized.

Figure 9:
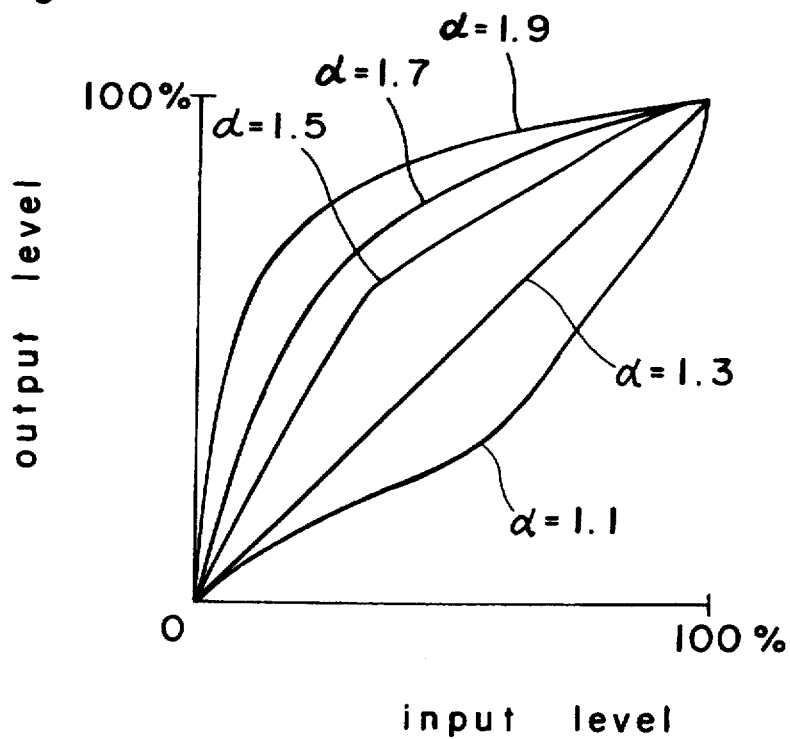
FIG. 9 is a graph of the input-output characteristic of dither pattern.

FIG. 9 is a graph of the input-output characteristic for correcting the four gradation characteristics shown in FIG. 8 with use of a laser of the light-emitting characteristic of $\alpha = 1.3$.

Figure 10:
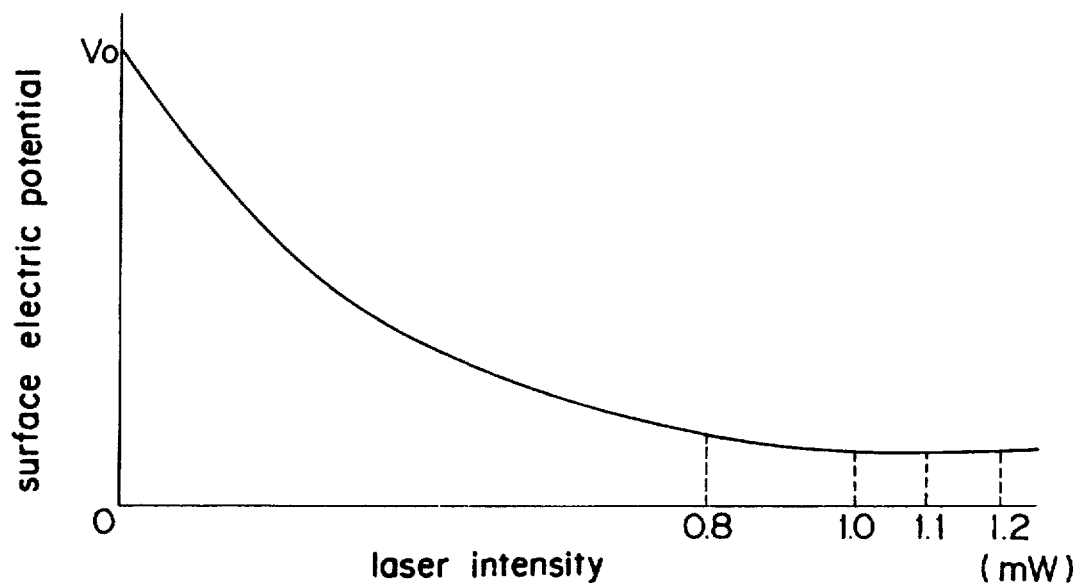
FIG. 10 is a graph of the surface electric potential when the laser intensity is changed under a constant light-emitting time.

Further, the gamma characteristic changes when the light intensity of laser beam is changed. FIG. 10 shows a graph of the surface electric potential of the photoconductor when a laser beam is exposed to a sensitized photoconductor by changing the light intensity of laser beam for a constant light-emitting time. When the light intensity is increased, the surface electric potential decreases at first but then saturates gradually. Then, the image density changes little at high light-intensities.

Figure 11:
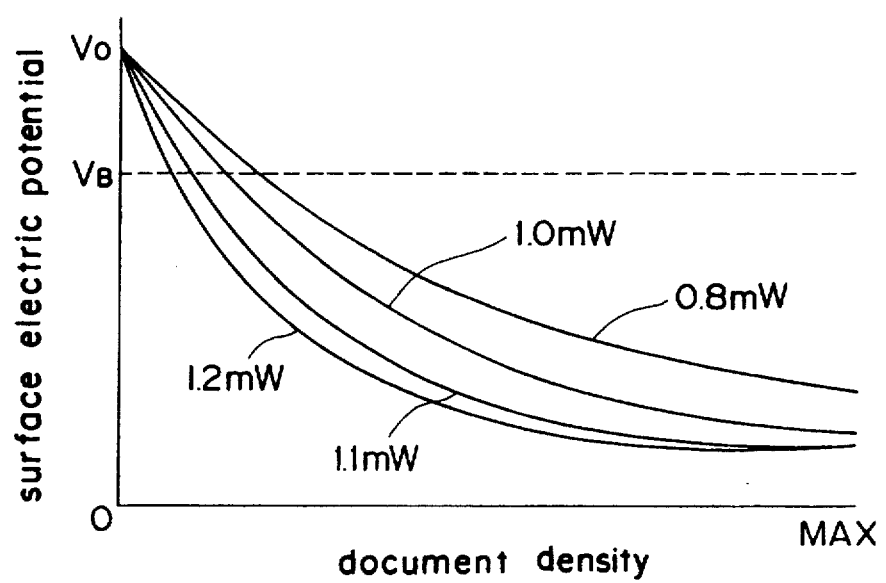
FIG. 11 is a graph of the surface electric potential when the maximum laser intensity is changed from 0.8 to 1.2 mW under a constant light emitting time.
Figure 12:
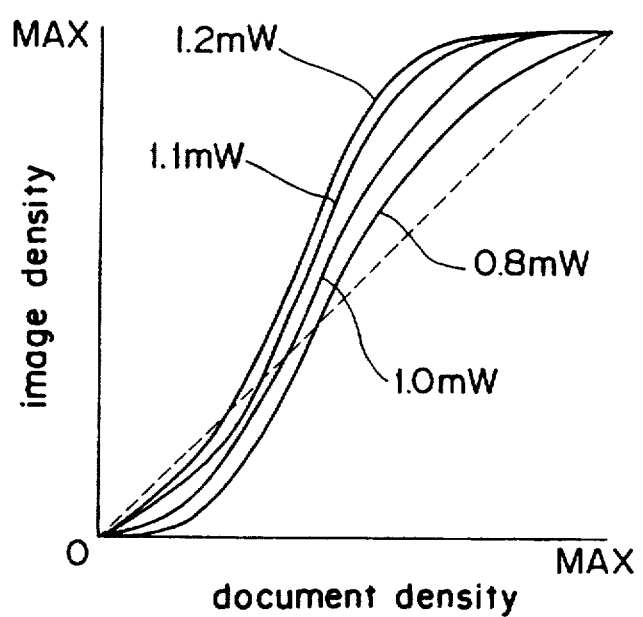
FIG. 12 is a graph of the gamma characteristic obtained from FIG. 11 by taking the development characteristic into account.

On the other hand, FIG. 11 shows a graph of the surface electric potential of the photoconductor when the light intensity is increased according to the document density from zero to a maximum of 0.8, 1.0, 1.1 and 1.2 mW while keeping the light-emitting time constant. Further, FIG. 12 shows a relation between the document density and the image density, that is, the gamma characteristic obtained from FIG. 10 by taking the development characteristic into account. Thus, it is clear that the gamma characteristic varies with the maximum light intensity, similarly as when $V_O$ or $V_B$ is changed.

In this embodiment, the variation of the gradation characteristic of a reproduced image caused by a change in the diffusion rate $\alpha$ or in the beam size is suppressed by using the above-explained phenomena, so as to reproduce an image with high fidelity to a document.

(B) diffusion rate, beam size and the intensity of laser beam

In a first embodiment according to the present invention, the gradation characteristic is controlled by changing the maximum light intensity of laser beam. That is, the light intensity is changed according to the value of the diffusion rate of the photoconductor and the beam size of laser beam.

First, the structure of a digital color copying machine of the first embodiment is explained.

(a) the structure of digital color copying machine

Figure 13:
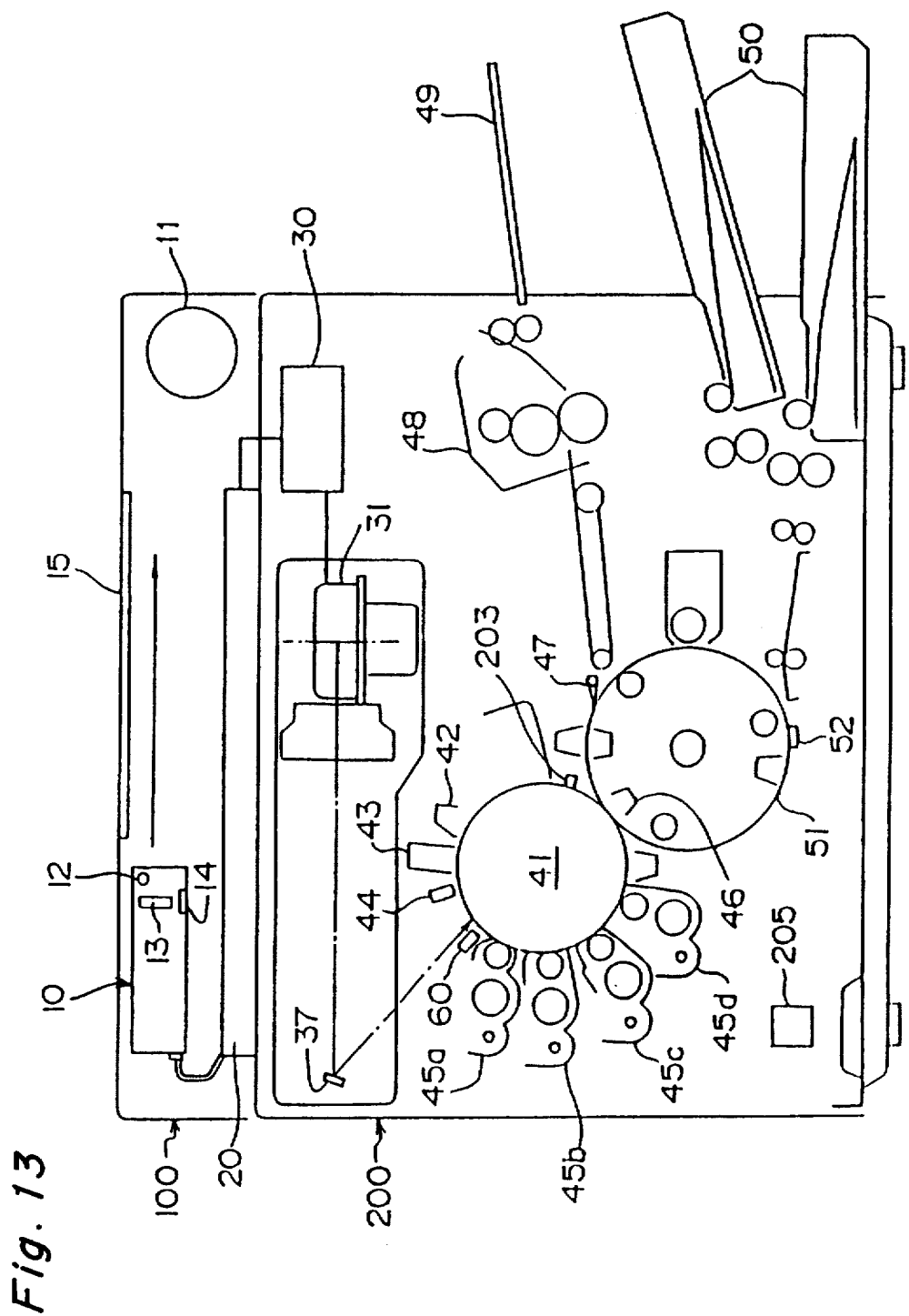
FIG. 13 is a sectional view of a digital color copying machine.

Referring now to the drawings, wherein like reference characters designate like or corresponding parts throughout the drawings, FIG. 13 shows the entire structure of a digital color copying machine according to an embodiment of the present invention. The copying machine consists mainly of an image reader part 100 for reading the image of a document and a print part 200 for reproducing the image read by the image reader part 100 with use of electrophotographic process.

In the image reader part 100, a scanner 10 has an exposure lamp 12 for illumination a document, a rod lens array 13 for concentration the reflecting light from the document, and a charge-coupled device (CCD) color image sensor 14 of a contact type for transducing the concentrated light to an electric signal. The scanner 10 is driven by a motor 11, when a document is read, to move in a direction (subscan direction) shown by an arrow so as to scan the document placed on a platen 15. The image of the document illuminated by the exposure lamp 12 is transduced into an electric signal by the image sensor 14. Multi-level electric signals of three colors of red (R), green (G) and blue (B) obtained by the image sensor 14 are converted into 8-bit gradation data of four colors of yellow (Y), magenta (M), cyan (C) and black (B) and the gradation data are stored in a buffer memory 30 for synchronization.

Next, in the copying part 200, a print head unit 31 performs the gradation correction (that is, gamma correction) of the received gradation data according to the gradation characteristics in the electrophotographic process for forming an image, converts the corrected gradation data into analog data, and generates a driving signal of a laser diode so as to make the laser diode emit a beam (refer FIG. 4).

The laser beam emitted from the print head unit 31 according to the gradation data exposes a photoconductor drum 41 via a reflecting mirror 37. In each copy action, the photoconductor drum 41 having a photoconductor layer, driven to be rotated, is illuminated by an eraser lamp 42, and the photoconductor layer is sensitized by a sensitizing charger 43 uniformly. When the exposure of the photoconductor drum 41 is performed in this state, an electrostatic latent image of a document is formed on the photoconductor drum 41. Then, one of toner development units 45a-45d of cyan, magenta, yellow and black is selected and develops the electrostatic latent image on the photoconductor drum 41 to form a toner image, which is transferred by a transfer charger 46 to a paper wound on a transfer drum 51. On the other hand, a standard toner image is formed in a predetermined area on the photoconductor drum 41 which is exposed at a predetermined light intensity and is developed. The amount of the adhered toners of the standard toner image is detected optically by an AIDC sensor 203. That is, the toner image is illuminated obliquely, and the reflecting light from the toner image is detected. The amount of the adhered toners can be obtained from the quantity of the reflecting light.

The above-mentioned print process is iterated as to the four colors of yellow (Y), magenta (M), cyan (C) and black (B). The scanner repeats in each process the scan action in synchronization with the action of the photoconductor drum 41 and the transfer drum 51. Then, the paper is separated from the transfer drum 51 by operating a separation claw 47, is fixed by a fixing unit 48, and is discharged in a tray 49. A paper is fed by a paper cassette 50, is chucked at its front tip on the transfer drum 51 by a chucking mechanism 52 so as not to cause a discrepancy of the position of a paper when the transfer is performed.

Figure 14:
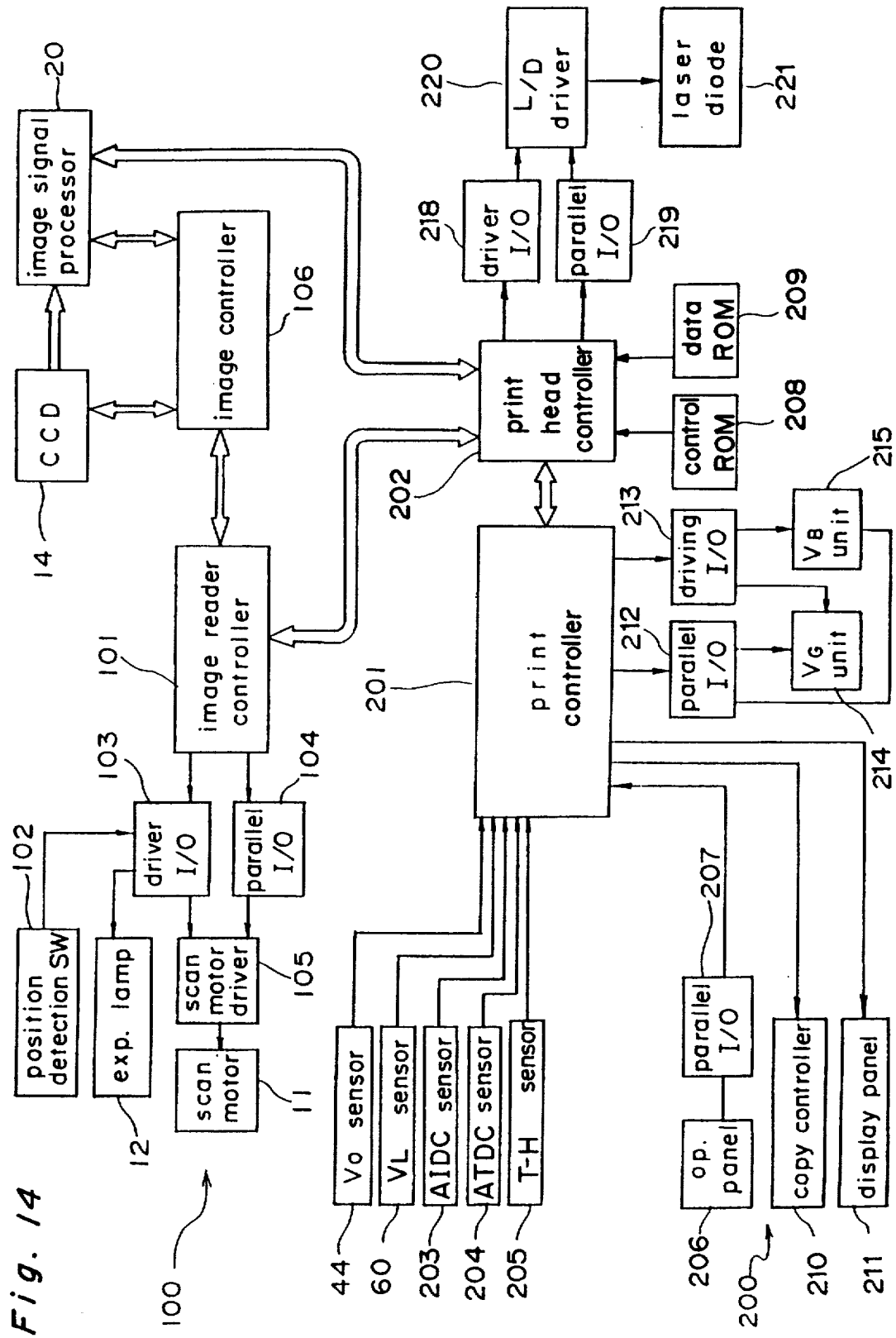
FIG. 14 is a block diagram of the control system of the digital color copying machine.

FIG. 14 shows a whole block diagram of a control system of the digital color copying machine of the embodiment of the present invention.

The image reader part 100 is controlled by an image reader controller 101, which controls the exposure lamp 12 via a driver input/output (I/O) device 103 according to the position signal from a position detection switch 102 which shows the position of a document on the platen 15. The image reader controller 101 also controls a scan motor driver 105 via the driver I/O device 103 and a parallel I/O device 104. The scan motor 11 is driven by the scan motor driver 105.

On the other hand, the image reader controller 101 is connected to an image controller 106 via a bus. The image controller 106 is connected via buses to the CCD color image sensor 14 and an image signal processor 20. An image signal from the image sensor 14 is supplied to the image signal processor 20 for the processing to be explained later.

The print part 200 has a print controller 201 for controlling print action and a print head controller 202 for controlling the print head 31 combined to each other via a bus. The print head controller 202 having a CPU is connected to a control read-only-memory (ROM) 208 and to a data ROM 209.

The print controller 201 receives analog signals from various sensors: a $V_O$ sensor 44 for detecting the surface electrical potential of the photoconductor drum 41 before exposure with a laser beam, a $V_L$ sensor 60 for detecting the surface electrical potential after exposure with a laser beam, the AIDC sensor 203 for detecting optically the amount of the adhered toners of a standard toner image formed on the photoconductor drum 41, an AIDC sensor 204 for detecting the toner density in the development units 45a–45d, a temperature and humidity sensor 205.

The print controller 201 controls a copy controller 210 and a display panel 211 according to the data obtained from the sensors 44, 60, 203–205, the operational panel 206 and the data ROM 209, while it controls a high voltage ($V_G$) unit 214 for generating the grid electric potential $V_G$ of the sensitization charger 43 and a high voltage ($V_B$) unit 215 for generating the development bias voltage $V_B$ of the development units 45a–45d via a parallel I/O device 212 and a driver I/O unit 213 in order to control the density automatically with the AIDC sensor 203 or manually with a key-input in the operational panel 206.

Figure 15A:
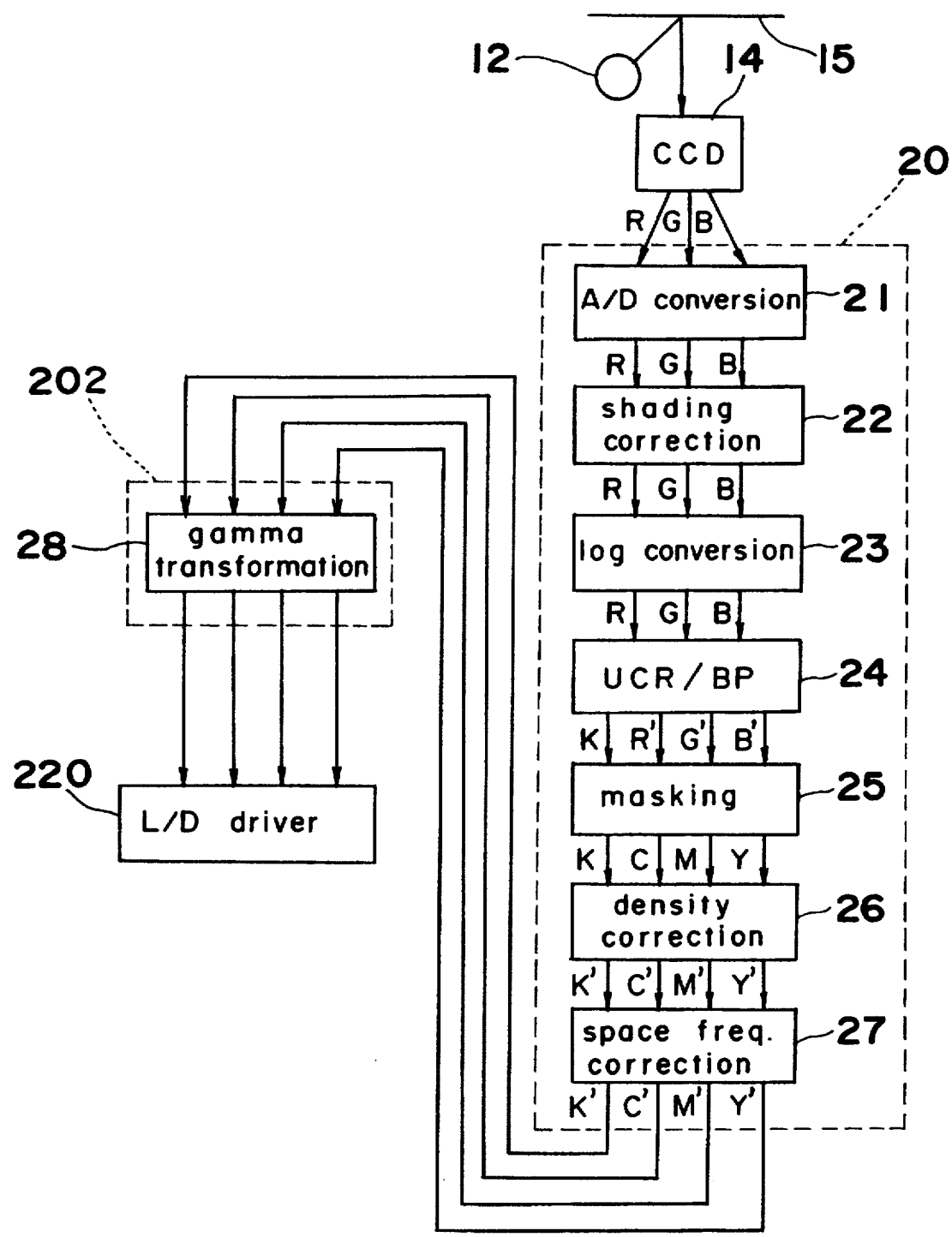
FIG. 15(a) is a block diagram of an image signal processor and FIG. 15(b) is a block diagram of a laser diode driver.

Further, the print head controller 202, acting the control program stored in the control ROM 208, is connected via an image data bus to the image signal processor 20 of the image reader part 100, while it controls a laser diode (I/O) driver 220 via a driver I/O device 218 and a parallel I/O device 219 by referring the contents of the data ROM 209 storing the data for gamma correction. A laser diode 221 is driven by the driver 220 for emitting a laser beam. The expression of gradation can be performed by the modulation of the intensity of a laser beam emitted by the laser under a constant pulse width. (In some embodiments, the gradation is expressed by using pulse width modulation method under a constant intensity of light.) (b) Processing of image signal FIG. 15(a) shows a flow of the processing of image signal from the CCD color image sensor 14 via the image signal processor 20 to the print controller 201. In the image signal processor 20, an image signal obtained by the CCD color image sensor 14 by using the photoelectric properties is converted to a multi-level digital image data of R, G, B by an analog-to-digital converter 21. The image data converted is corrected for shading by a shading correction circuit 22. The image data corrected is converted to a density data of an actual image by using a log conversion with a log conversion circuit 23. Further, the density data is processed by a UCR/BP (undercolor remove/black paint) circuit 24 to remove unnecessary black coloring and to generate a true black data K from the R, G, B data, and then the data R, G, B of the three colors, red, green and black, are transformed into data Y, M, C of the three colors of yellow, magenta and cyan by the masking processor circuit 25. A density correction circuit 26 processes density correction by multiplying predetermined coefficients to the Y, M, C data transformed as describe above, and then a space frequency correction circuit 27 performs the space frequency correction on the data processed by the density correction circuit 26. Finally, the data of each color are supplied to the print head controller 202 as multi-level density data of level 0–255.

In the print head controller 202, the image signals received form the image signal processor 20 are processed by a gamma transformation part 28 for the gamma transformation according to a transformation table stored in the data ROM 209, and the transformed image signals are supplied to the laser diode driver 220.

Figure 15B:
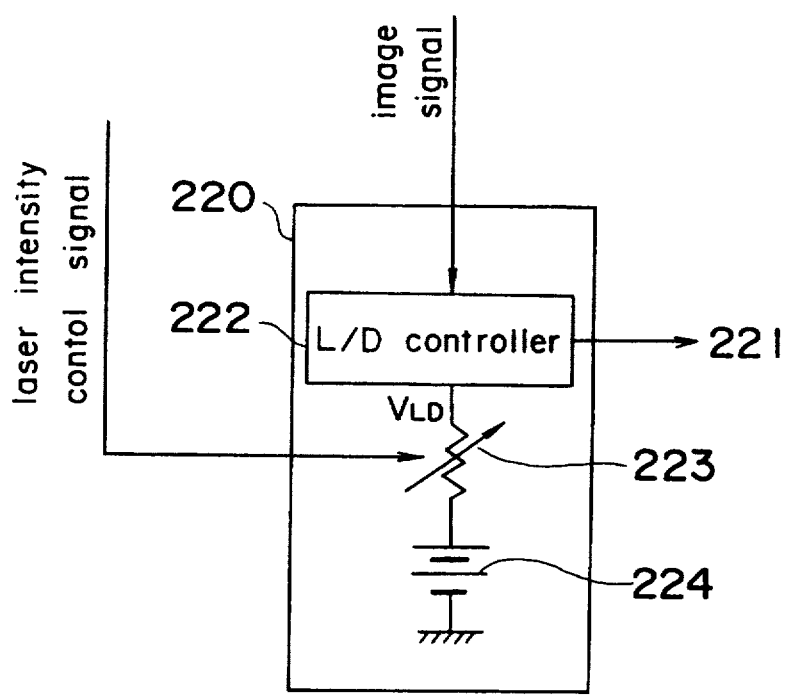

FIG. 15(b) shows the structure of the laser diode driver 220 wherein the resistance value of a variable resistance 223 interposed between an electric power source 224 and an laser diode controller 222 is changed according to a laser intensity control signal received from the print head controller 202. In other words, the print head controller 202 controls the driving electric voltage $V_{LD}$ according to the laser intensity control signal. On the other hand, an image signal is received by the laser diode driver 220 in the laser diode driver 222 and the laser diode driver 222 amplifies the image signal with a gain determined by the driving electric voltage $V_{LD}$, and sends the amplified signal to the laser diode 221.

(c) flow of print control

The print control of the first embodiment is explained below.

Figure 16:
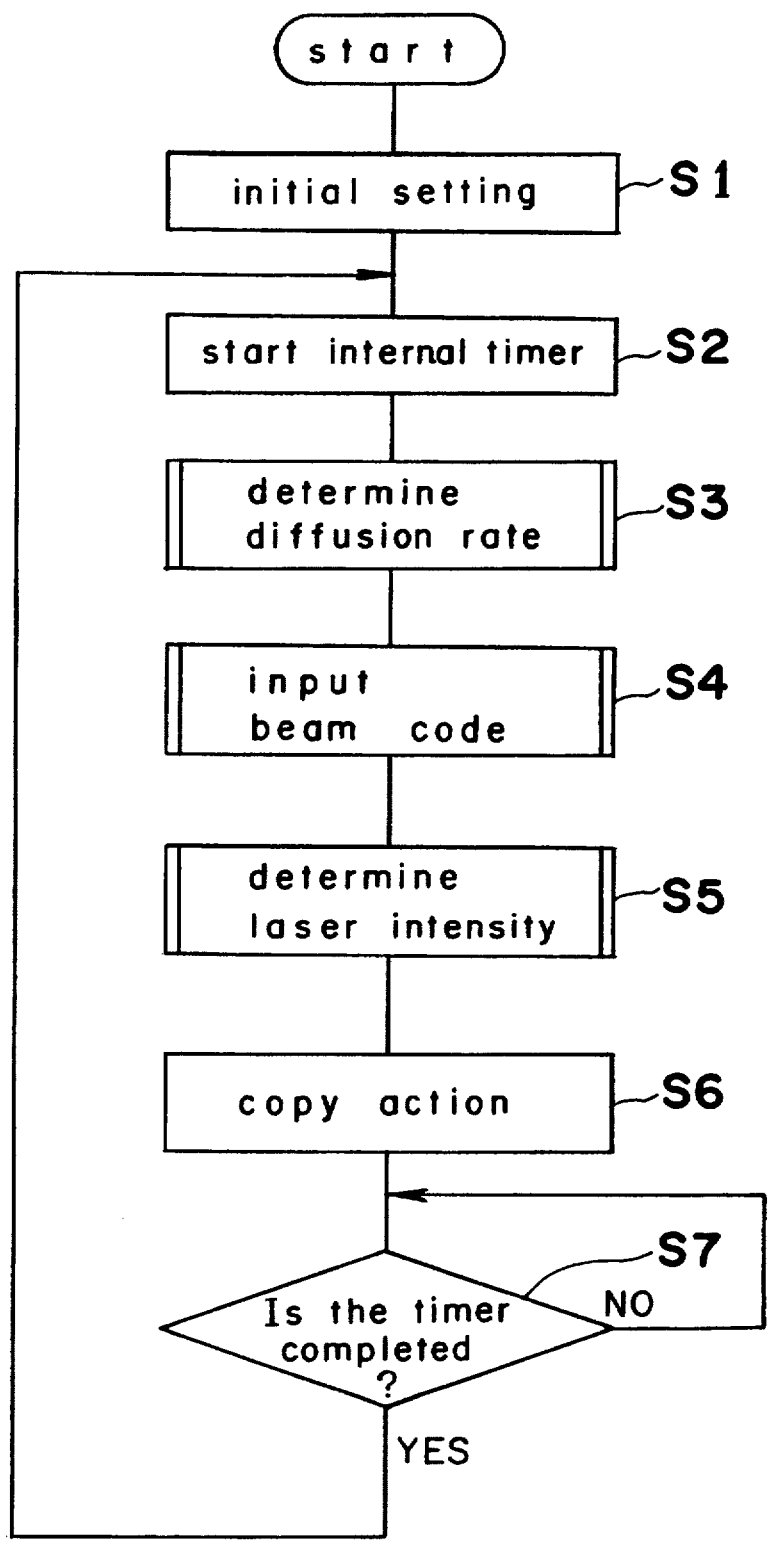
FIG. 16 is a flowchart of main control of the digital color copying machine of the first embodiment.

FIG. 16 shows the main flow of the print controller 201. First, the initial setting such as the initialization of parameters is performed (step S1). Next, an internal timer is started (step S2). Then, the diffusion rate is determined (step S3) and a beam code in correspondence with the beam size is inputted (step S4). Next, the light intensity of laser diode 221 is determined (step S5). That is, the light intensity in correspondence with the maximum image density (hereinafter referred to as maximum intensity) is selected according to the diffusion rate $\alpha$ and the beam size so as to suppress a change in the gradation expression. In case of the pulse width modulation method, the laser light intensity is controlled. Then, the copy action is performed (step S6). After the completion of the internal timer is detected (YES at step S7), the main flow returns to step S2.

The diffusion rate determination processing (FIG. 16, step S3) will be explained below. The diffusion rate can be determined in two ways.

In a first method of determining the diffusion rate is obtained by a data input by an operator. The diffusion rate has already been measured at a factory or the like when the photoconductor to be used was manufactured. The diffusion rate is inputted when the photoconductor is replaced or it has not yet been inputted by an operator.

In this embodiment, the diffusion rate is coded according to the value in five steps, and the diffusion rate code P is determined as follows:

$a \leq 1.2: P = 1$ $1.2 < a \leq 1.4: P = 2$ $1.4 < a \leq 1.6: P = 3$ $1.6 < a \leq 1.8: P = 4$ $1.8 < a \leq 2.0: P = 5$.

That is, when the diffusion rate code P becomes smaller, the degree of the diffusion of latent image in the photoconductor decreases and the gamma characteristic has a sharper rise around the origin.

Figure 17:
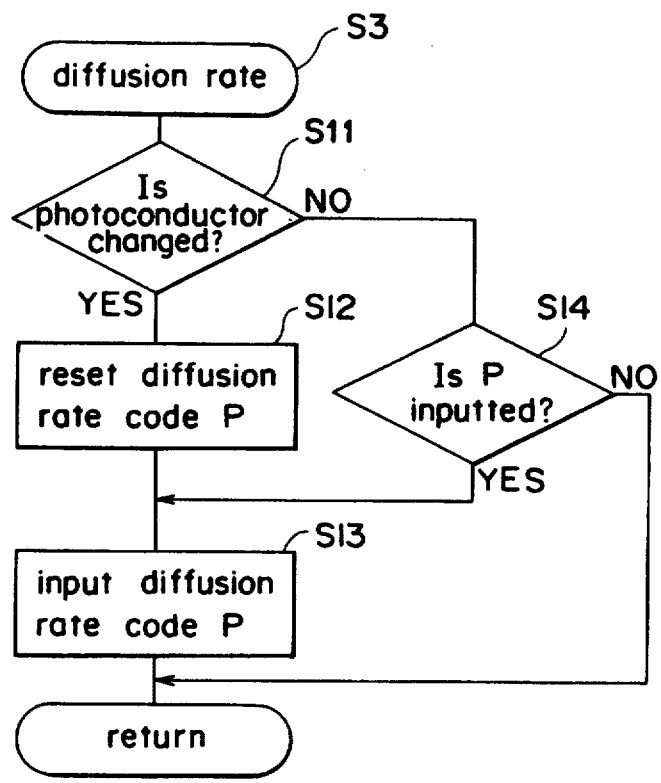
FIG. 17 is a flow of the determination processing of diffusion rate.
Figure 18:
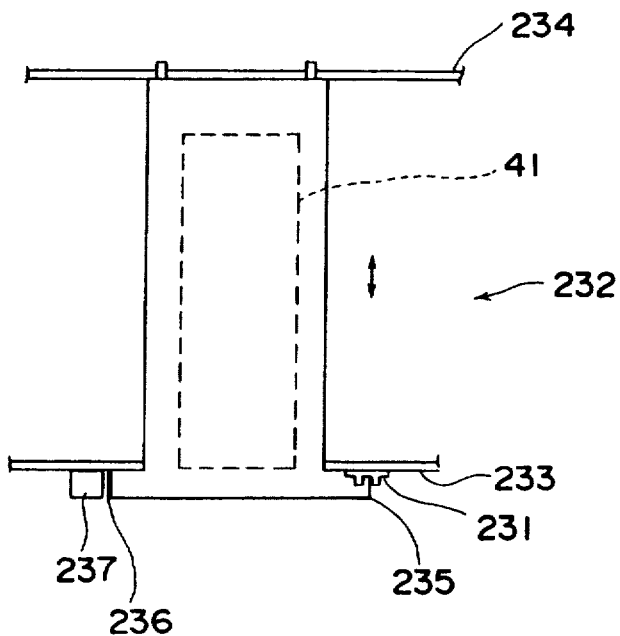
FIG. 18 is a top plan view of a photoconductor assembly.

FIG. 17 show a flow of this method. First, it is decided whether the photoconductor drum 41 is replaced or not (step S11). The replacement of the photoconductor drum can be detected for example as will be explained below. As shown in FIG. 18, a photoconductor assembly 232 including a photoconductor drum 41 is inserted from an inlet of a front plate 233 until the top of the photoconductor assembly 232 makes contact with a rear plate 234 so that the photoconductor assembly 232 is held by the plates 233 and 234. A photoconductor lock switch 231 of photointerrupter type is mounted on the front plate 233. The photoconductor assembly 232 has a shading part 235 which enters into a groove of the photoconductor lock switch 230 and shades an optical path between the light-emitting part and the light receiving part (not shown). Thus, if a photoconductor assembly 232 is removed for replacement, the shading part 235 is removed from the photoconductor lock switch 231 so that the light from the light-emitting part is detected by the light-receiving part. The detection signal is sent to the print controller 201. Therefore, the print controller 201 can check the replacement of the photoconductor assembly 232; when the light to the light-receiving part is shaded again, it is detected that a photoconductor is set again.

Returning to the examination of the flow of the diffusion rate determination processing shown in FIG. 17, after the replacement of a photoconductor (that is, the photoconductor assembly 232) is detected (YES at step S11), the diffusion rate code P to be stored is reset (step S12), and a diffusion rate code P to be stored is reset (step S13). If the photoconductor is not replaced (NO at step S12), and the diffusion rate code P has not yet been stored (YES at step S13), for example at the time of the set up of a printer, a diffusion rate code P is inputted (step S14). Otherwise, the flow returns to the main flow.

In a modified example of this method of inputting the diffusion rate code P, as shown also in FIG. 18, a code information mark 236, representing the diffusion rate code P is attached to the photoconductor assembly 232. Then, as soon as the photoconductor lock switch 231 detects the mounting of a photoconductor assembly 232, a mark reader 237 reads the code information mark 236. Thus, the forgetting or erring an input of the diffusion rate code P can be prevented, and an operator need not take care of the input of the diffusion rate code P.

The diffusion rate may also be inputted manually with the operating panel 206.

In the beam code input processing (step S4 in FIG. 16), a beam code C is inputted in order to get the beam size of the laser diode 221 to be equipped. The beam code C is determined beforehand according to the size of laser beam of a plurality of laser diodes to be used. In this embodiment, the beam code C is assigned according the five kinds of beam sizes:

If the beam size is very small, beam code C = 1,
If the beam size is small, beam code C = 2,
If the beam size is usual, beam code C = 3,
If the beam size is large, beam code C = 4,
If the beam size is very large, beam code C = 5.

That is, the gamma characteristic rises sharper around the origin if the beam code C is smaller.

Figure 19:
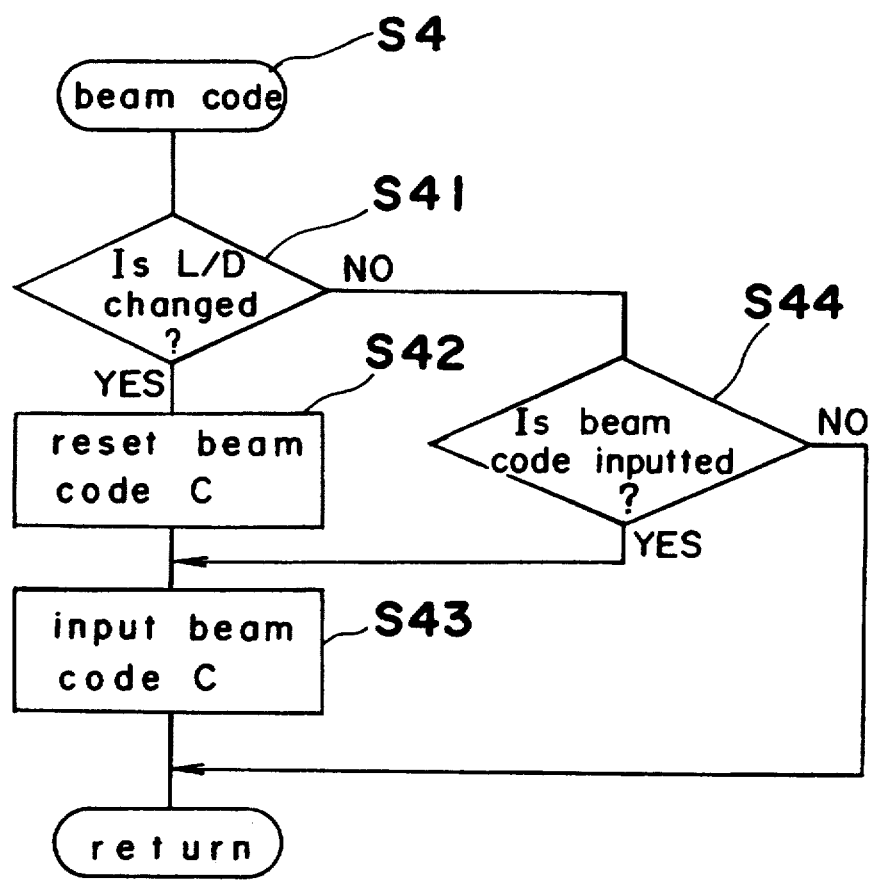
FIG. 19 is a flowchart of beam code input processing.

FIG. 19 shows the flow of the beam code input processing. First, it is decided if the photoconductor is replaced or not (step S41). If the photoconductor is decided to be replaced (YES at step S41), the beam code C to be stored until the present time is reset (step S42), and a beam code C is inputted newly (step S43). If the laser diode 221 is not replaced (NO at step S41), but it is decided that a beam code has not yet been stored (YES at step S44), for example before the set up, a beam code is inputted (step S43). If the beam code has already beam inputted (NO at step S44), the flow returns to the main flow.

As explained above, the replacement of a laser diode 221 and the input of a beam code C accompanied by the replacement are detected by the photointerrupter-type sensor and a code information mark attached on the print head unit. However, the input of the beam code may also be performed manually by a user with the operational panel 206.

The laser intensity determination processing (step S5 in FIG. 16) is explained below, wherein the laser intensity is determined according to the values of the diffusion rate code P and the beam code C suitable for correcting the gamma characteristic.

The light intensity modulation method is used in this embodiment, so that the laser intensity means the maximum light intensity of laser beam of the laser diode 221.

In this embodiment, the diffusion rate code P and the beam code C change at five steps. Thus, by combining both codes, the laser intensity changes at twenty five steps. The laser intensity is determined beforehand for each combination of the beam code C and the diffusion rate code P by experiments. As explained above, the gamma characteristic rises sharper around the origin with decreasing diffusion rate code P or beam code C.

Figure 20:
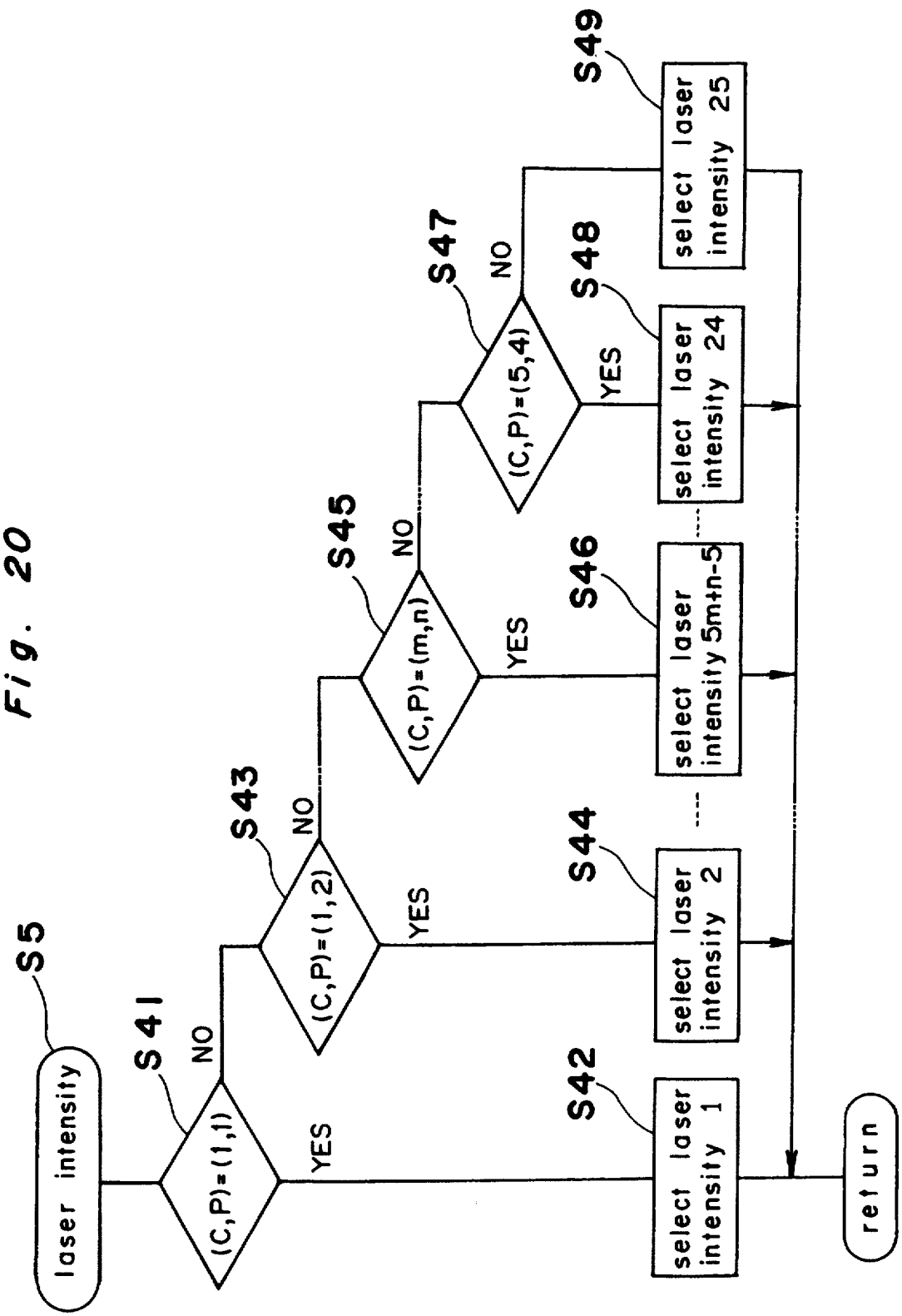
FIG. 20 is a flowchart of laser intensity determination processing.

FIG. 20 shows the flow of the laser intensity determination processing. First, it is decided if both beam code C and diffusion rate code P are one or not (YES at step S41), this is a combination that the gamma characteristic rises most sharply around the origin, so that the lowest laser intensity $P_1$ is selected in order to compensate the sharp rise (step S42). When it is decided that the beam code C is one and the diffusion rate code P is two (YES at step S43), the laser intensity $P_2$ is selected (step S44).

In other combinations, the laser intensity is determined similarly. When it is decided that the beam code C is m and the diffusion rate code P is n (YES at step S45), the laser intensity $P_{5m+n-5}$ is selected (step S46).

Finally when it is decided that the beam code C is five and the diffusion rate code P is four, the laser intensity $P_{24}$ is selected (step S48); otherwise the laser intensity $P_{25}$ which is the largest among all the laser intensities is selected so as to compensate the most mild gamma characteristic among the combinations.

By exposing the photoconductor at the selected laser intensity, the change in the gamma characteristic is suppressed, and the appropriate gamma correction is performed.

Figure 21:
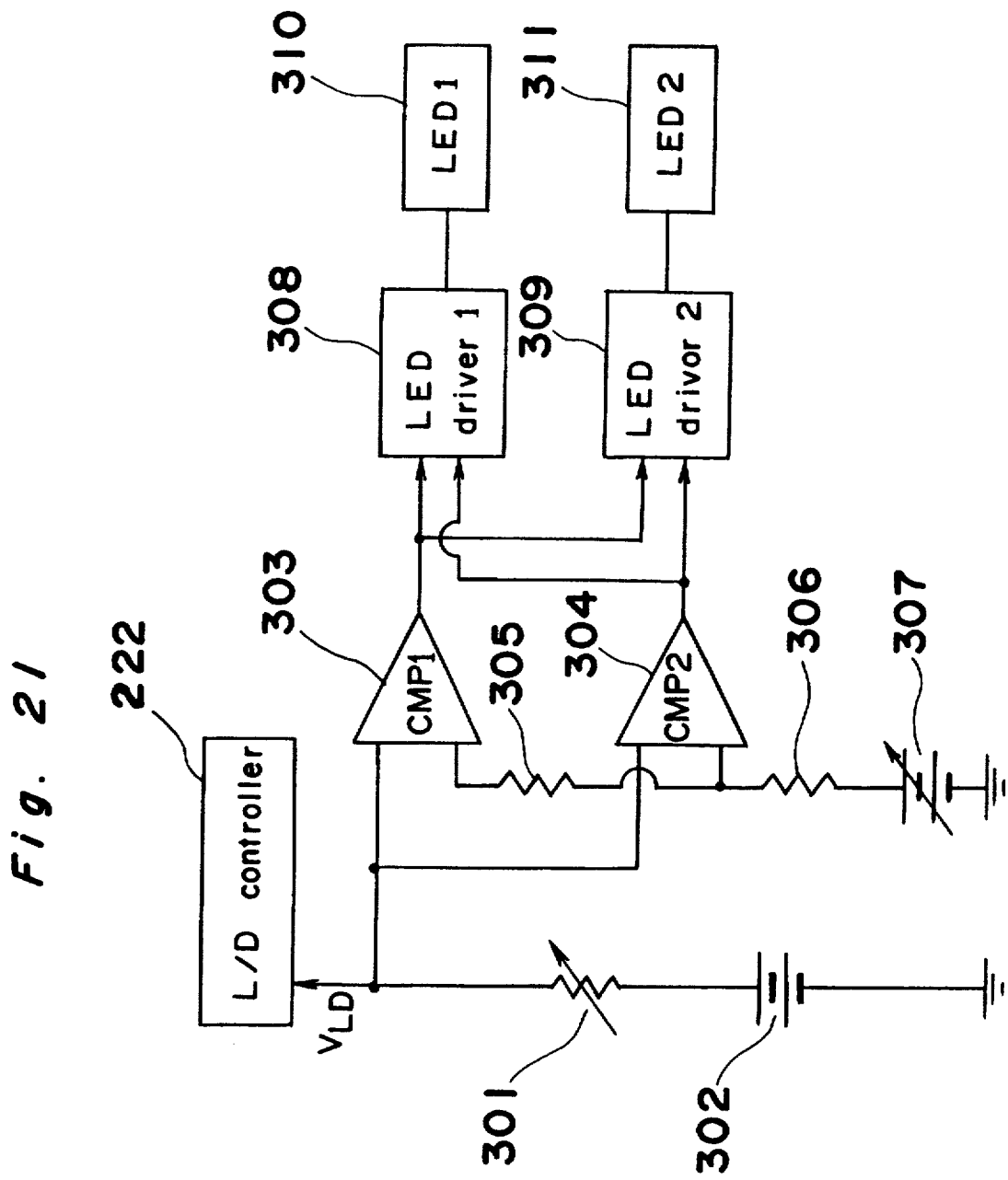
FIG. 21 is another flow of the determination processing of diffusion rate.

FIG. 21 shows a circuit diagram for setting manually the maximum light intensity of the laser diode selected in the laser intensity determination processing (step S5). The electric voltage $V_{LP}$ is supplied to a laser diode controller 222 included the laser diode driver 220 (FIG. 15), and it is controlled by a variable resistor 301 which is connected between the laser diode controller 222 and a voltage source 302. The electric voltage is also supplied to first and second comparators 303 and 304. On the other hand, electric voltages $V_R - \Delta V$ and $V_R + \Delta V$ are supplied to the first and second comparators 303 and 304 through resistors 305 and 306 by a variable voltage source 306. The electric voltage of the variable voltage source 307 can be known exactly with a meter, a dial or the like (not shown). The outputs of the comparators 303 and 304 are supplied to first and second LED drivers 308 and 309, for driving first and second LED's 310 and 311.

In this circuit, if $V_{LD} < V_R - \Delta V$, only the first LED 310 is turned on, while if $V_{LD} > V_R + \Delta V$, only the second LED 311 is turned on. However, if $V_R - \Delta V \leq V_{LP} \leq v_R + \Delta V$, both LED's 310 and 311 are turned off. In other words, if both LEDs 310, 311 are turned off by controlling the variable resistor 301, the control of the output power of the laser diode 221 is completed. Then, an image can be formed with use of appropriate gamma characteristic. If $\Delta V$ is smaller, the precision of the agreement between $V_{LP}$ and $v_R$ is improved better.

Though the laser intensity is controlled by the light intensity modulation method, the quantity of light of laser beam can also be controlled by controlling the pulse width under a constant laser intensity in the pulse width modulation method to control the pulse according to the diffusion rate and the beam size. Further, the quantity of light can also be controlled similarly in case of the multi-level dither method.

(B) automatic determination of diffusion rate (second embodiment)

In a second embodiment of the present invention the diffusion rate is determined automatically by the detection by the copying machine itself. The structure of a copying machine and the image data processing are the same as in the first embodiment explained above with reference to FIGS. 13-15. The print controller 201 acts similarly except the diffusion rate determining processing (FIG. 17). In order to detect the diffusion rate, it is necessary to measure the beam size of laser beam and the size of latent image. However, the direct measurement of the size of latent image is difficult. Therefore, a predetermined pattern of electrostatic latent image is formed on the photoconductor, and the surface electric potential after the exposure with the laser beam is measured by the $V_L$ sensor 60 (refer FIG. 13) in order to detect the decrease in electric potential of the latent image from the initial surface potential $V_O$ to a decay electric potential $V_L$, and the diffusion rate is obtained from the degree of the lowering of electric potential. The diffusion rate $\alpha$ is small if the lowering of electric potential is large and vice versa.

The diffusion rate is calculated as follows. First, the photoconductor is sensitized by corona discharge to have a uniform surface electric potential. Then, the photoconductor is divided into N regions, and a predetermined pattern of laser beam exposes the photoconductor in the regions at light intensities of W(1), W(2), ..., W(N) different to each other in a density region wherein the gamma characteristic is almost linear. The laser exposure is performed at the same light intensity in the same region. Then, the electric potentials V(1), V(2), ..., V(N) of the electrostatic latent image are measured for each region. It should be noted that the obtained electric potential is the average of the values measured at a plurality of points in a region. On the other hand, the data of the electric potentials of electrostatic latent image of two photoconductors of known diffusion rates $\alpha_1$ and $\alpha_2$ are stored in the data ROM 209 beforehand for each region exposed by the same light intensity as the above-mentioned one. In other words, the data include the electric potential V1(1) for the light intensity W(1) of the laser beam, the electric potential V1(2) for the light intensity W(2), ..., the electric potential V1(N) for the light intensity W(N) as to the photoconductor of the diffusion rate $\alpha_1$, and the electric potential V2(1) for the light intensity W(1), the electric potential V2(2) for the light intensity W(2), ..., the electric potential V2(N) for the light intensity W(N) as to the photoconductor of the diffusion rate $\alpha_2$. From these data, the diffusion rate $\alpha$ can be calculated for each region by using a proportional relation. That is, the diffusion rate $\alpha$ is calculated for the n-th region (n = 1, 2, ..., N) by the following equation:

$$V(n) = V1(n) + (V2(n) - V1(n)) * (\alpha - \alpha_1)/(\alpha_2 - \alpha_1).$$

Then, the average of the calculated values $\alpha$ of all the regions is obtained, and it is regarded as the final value of $\alpha$.

Figure 22:
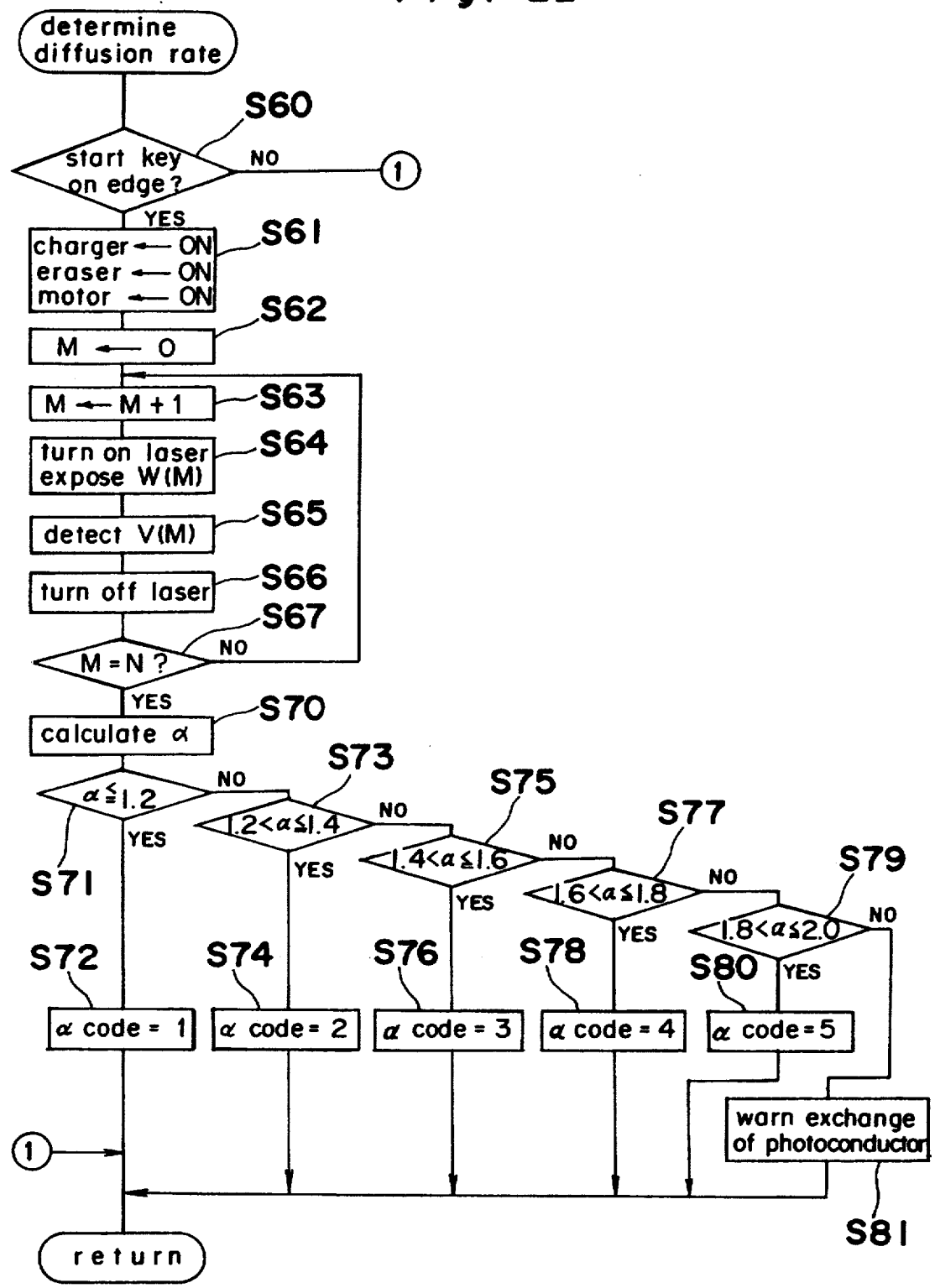
FIG. 22 is a circuit diagram for setting manually the maximum light intensity.

FIG. 22 show the flow of the determination of the diffusion rate in the second method explained above. First, it is decided if a key-input of a copy start key is received or not (step S20). If the key-input is received (YES at step S60), the sensitizing charger 43, the eraser 42 and the motor 11 are turned on (step S61) for the preparation of exposure. Next, a variable M for showing the order of image regions is reset to zero (step S62), and the flow proceeds to a loop for detection the electric potentials of electrostatic latent image.

In this loop, first, the variable M is increased by 1 (step S63), and the laser diode 221 is turned on to expose the M-th region (step S64). Then, the electric potential V(M) of electrostatic latent image of the M-th regions is measured with the $V_L$ sensor 60 at a plurality of image points, and the average of the measured values is calculated (step S65). Then, the laser diode 221 is turned off for the next exposure (step S66). Then, if it is decided that M is not yet increased to the final value N (step S67), the flow returns to step S63, and the loop is iterated until M attains to N (YES at step S67).

If the electric potentials V(M) of all the regions are measured, the diffusion rate $\alpha$ is calculated by averaging the values for each region (step S70). Then, the diffusion rate code P is determined according to the value of $\alpha$. That is, if $\alpha \leq 1.2$ (YES at step S71), P is set to be one (step S72). If $1.2 < \alpha \leq 1.4$ (YES at step S73), P is set to be two (step S74). IF $1.4 \leq \alpha \leq 1.6$ (YES at step S75), P is set to be three (step S76), if $1.6 \leq \alpha \leq 1.8$ (YES at step S77), P is set to be four (step S78). If $1.8 < \alpha \leq 2.0$ (YES at step S79), P is set to be five (step S80). If $\alpha > 2.0$, a warning signal is outputted for urging the replacement of the photoconductor (step S81), because the photoconductor is decided to be deteriorated too much to be used practically.

In this embodiment, the diffusion rate is measured before the start of copying. However, the measurement may also be performed for example when the photoconductor is replaced or when the electric power is turned on.

(C) diffusion rate, beam size and gamma transformation table

In a third embodiment of the present invention, the gradation correction is performed by changing a gamma transformation table according to the diffusion rate and the beam size.

The structure of a copying machine and image data processing are the same as in the first embodiment explained above with reference to FIGS. 13–15.

Figure 23:
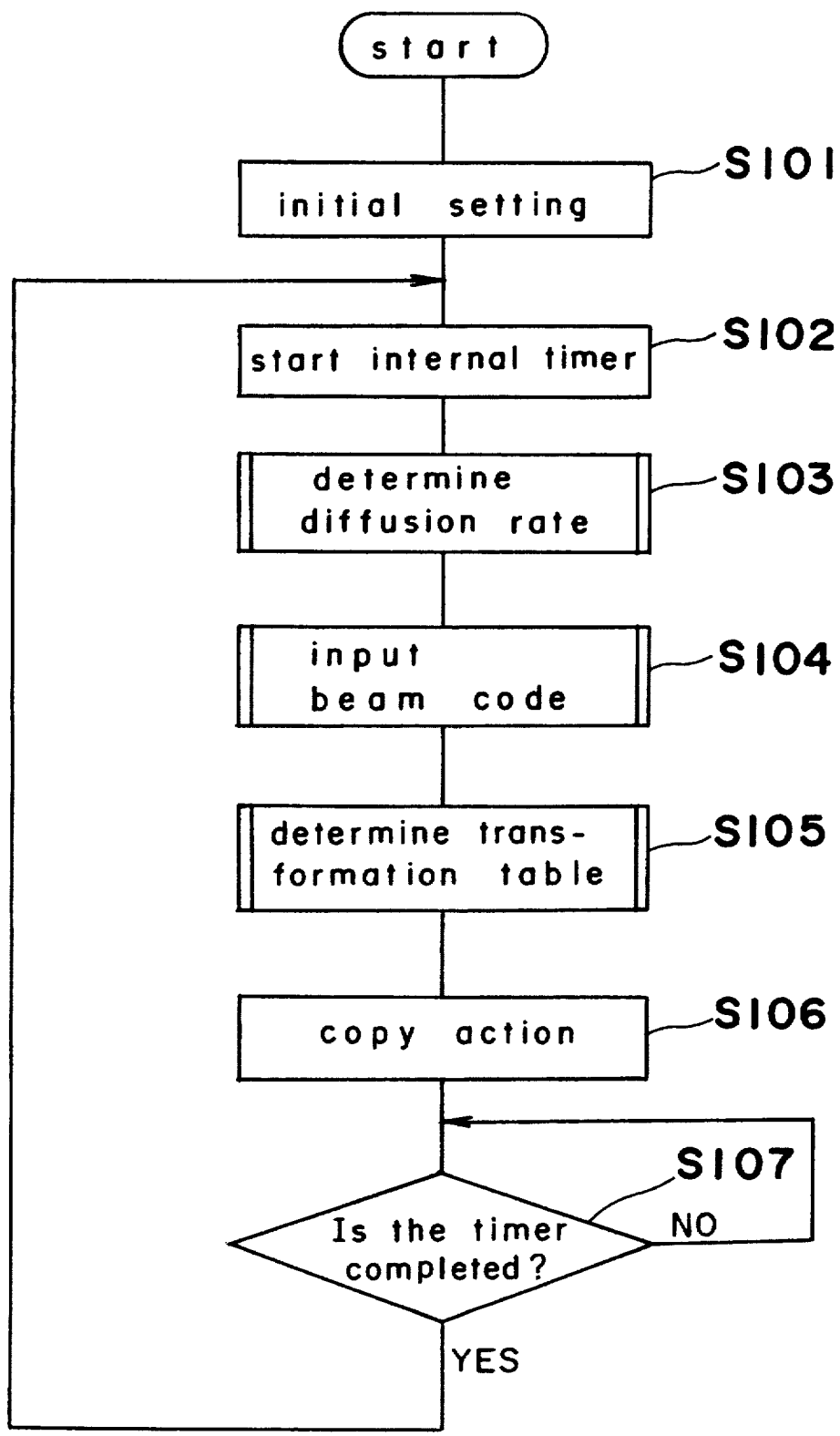
FIG. 23 is a flowchart of the digital color copying machine of the third embodiment.

The print control of the second embodiment will be explained below. FIG. 23 shows the main flow of the print controller 201. First, the initial setting such as the initialization of parameters is performed (step S101). Next, an internal timer is started (step S102). Then, the diffusion constant is determined (step S103) and a beam code in correspondence with the beam size is inputted (step S104). Then, the transformation table for the gamma correction is determined (step S105). That is, the transformation in correspondence with the maximum image density is changed according to the diffusion rate $\alpha$ and the beam size so as to suppress a change in the gradation expression. In case of the pulse width modulation method, the laser light intensity is controlled. Then, copy action is performed (step S106). After the end of the internal timer is detected (YES at step S107), the main flow returns to step S102. Except step S105, the processing of steps S101–S107 is the same as in the print control of the first embodiment (FIG. 16).

The transformation table determination processing (step S105 in FIG. 23) is explained below, wherein the transformation table for the gamma correction is determined so as not to affect the gamma characteristic according to the values of the diffusion rate code P and the beam code C.

In this embodiment, the diffusion rate code P and the beam code C change in five steps. Thus, by combining both codes, the transformation table changes in twenty five steps. The transformation tables are determined beforehand for each combination of the beam code C and the diffusion rate code P by experiments. As explained above, the gamma characteristic rises sharper around the origin with decreasing diffusion rate code P or beam code C.

Figure 24:
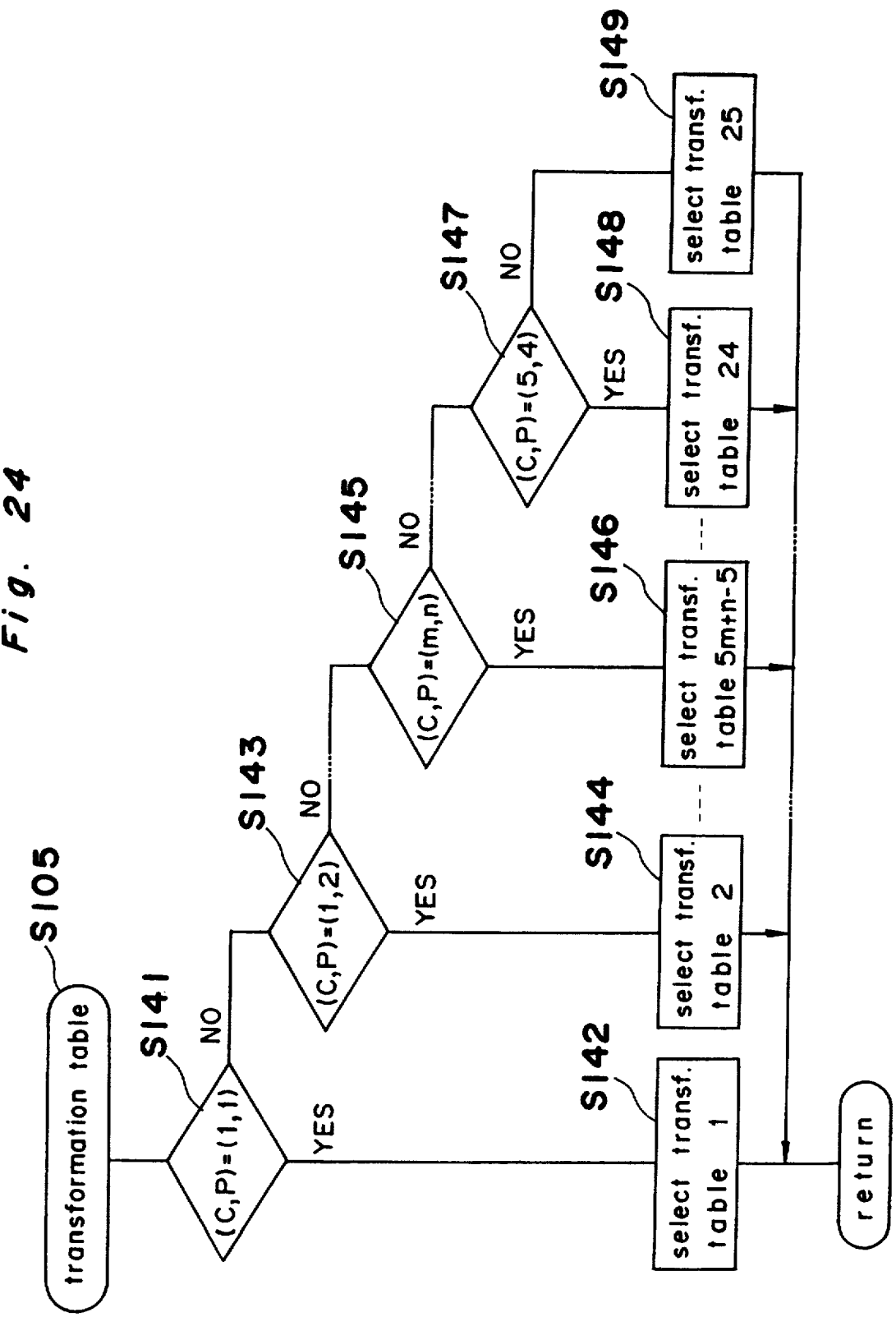
FIG. 24 is a flowchart of the transformation table determination processing.

FIG. 24 shows the flow of the transformation table determination processing. First, when both beam code C and diffusion rate code P are decided to be one (YES at step S141). This is a combination of beam code C and diffusion rate code P that the gamma characteristic rises most sharply around the origin, so that the transformation table 1 which makes the gamma characteristic mildest is selected in order to compensate the sharp rise (step S142). When it is decided that the beam code C is one and the diffusion rate code P is two (YES at step S143), the transformation table 2 is selected (step S144).

In other combinations, the laser intensity is determined similarly. When it is decided that the beam code C is m and the diffusion rate code P is n (YES at step S145), the transformation table $5m+n-5$ is selected (step S146).

Finally, when it is decided that the beam code C is five and the diffusion rate code P is four, the transformation table 24 is selected (step S148); otherwise the transformation table 25 which is the largest among all the laser intensities is selected so as to compensate the most mild gamma characteristic among the combinations.

By processing image data with the selected transformation table, the change in the gamma characteristic is suppressed, and the appropriate gamma correction is performed.

The third embodiment can be applied to apparatuses for various methods such as the light intensity modulation method, the dither method, and the multi-value dither method.

(D) diffusion rate, beam size and dither pattern

In the fourth embodiment of the present invention, the gradation is expressed by using a multi-value dither method. The gradation correction is performed by changing the threshold values of the dither matrix according to the diffusion rate and the beam size.

The structure of a copying machine is the same as that in the first embodiment explained above with reference to FIGS. 13 and 14, while the image data processing is a little different from that of the first embodiment.

Figure 25:
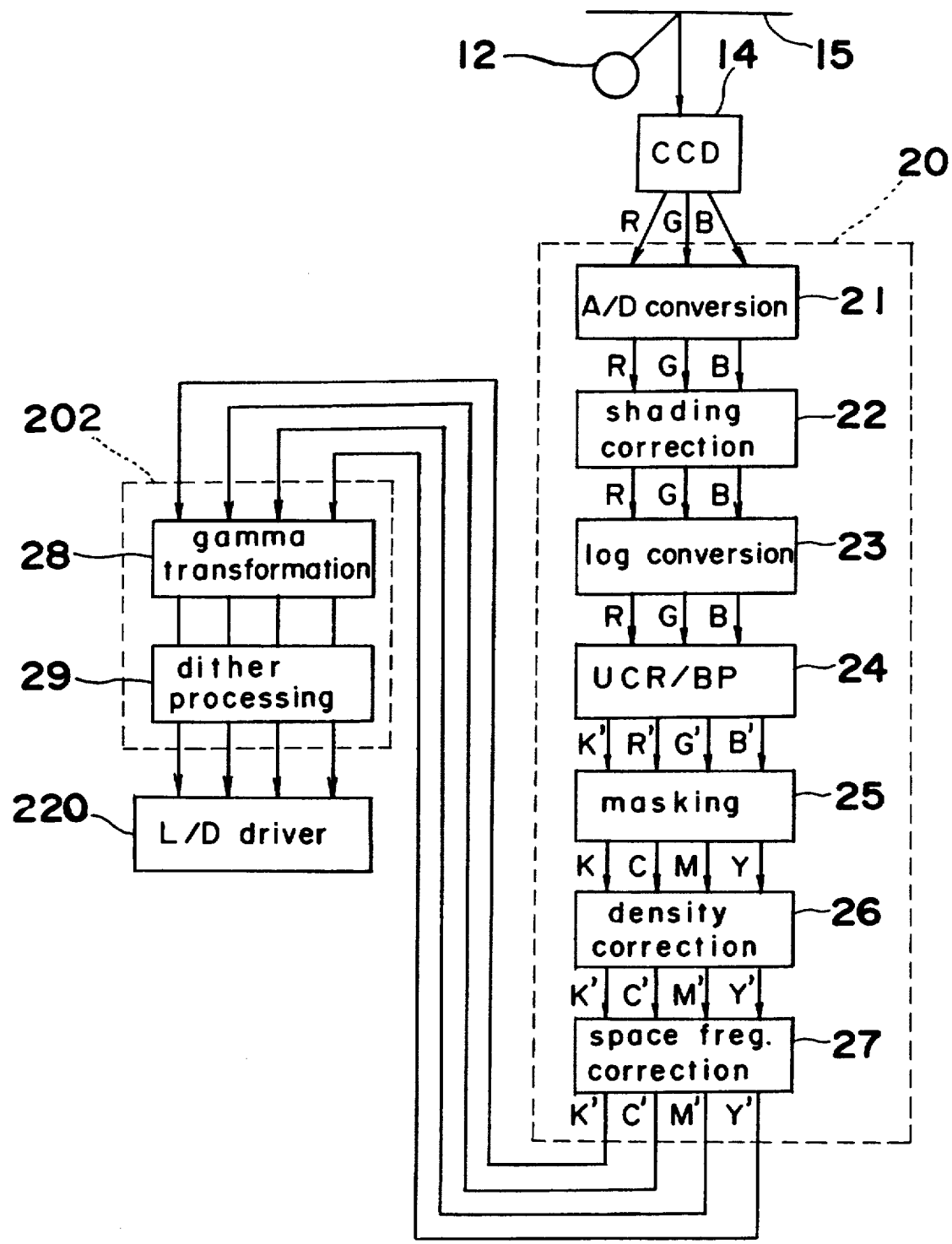
FIG. 25 is a block diagram of an image signal processor.

FIG. 25 shows the block diagram of the image data processor of the third embodiment. The difference of this image data processing from that of the first one shown in FIG. 15 is that a dither processing part 29 in the print controller 201 is interposed between the gamma transformation part 28 and the laser diode driver 220. That is, a signal supplied from the gamma transformation part 28 is processed by the dither processing part 29 by using the dither threshold value data stored in the data ROM 209, and then the output signal of the dither processing part 29 is supplied to the laser diode driver 220.

Figure 26:
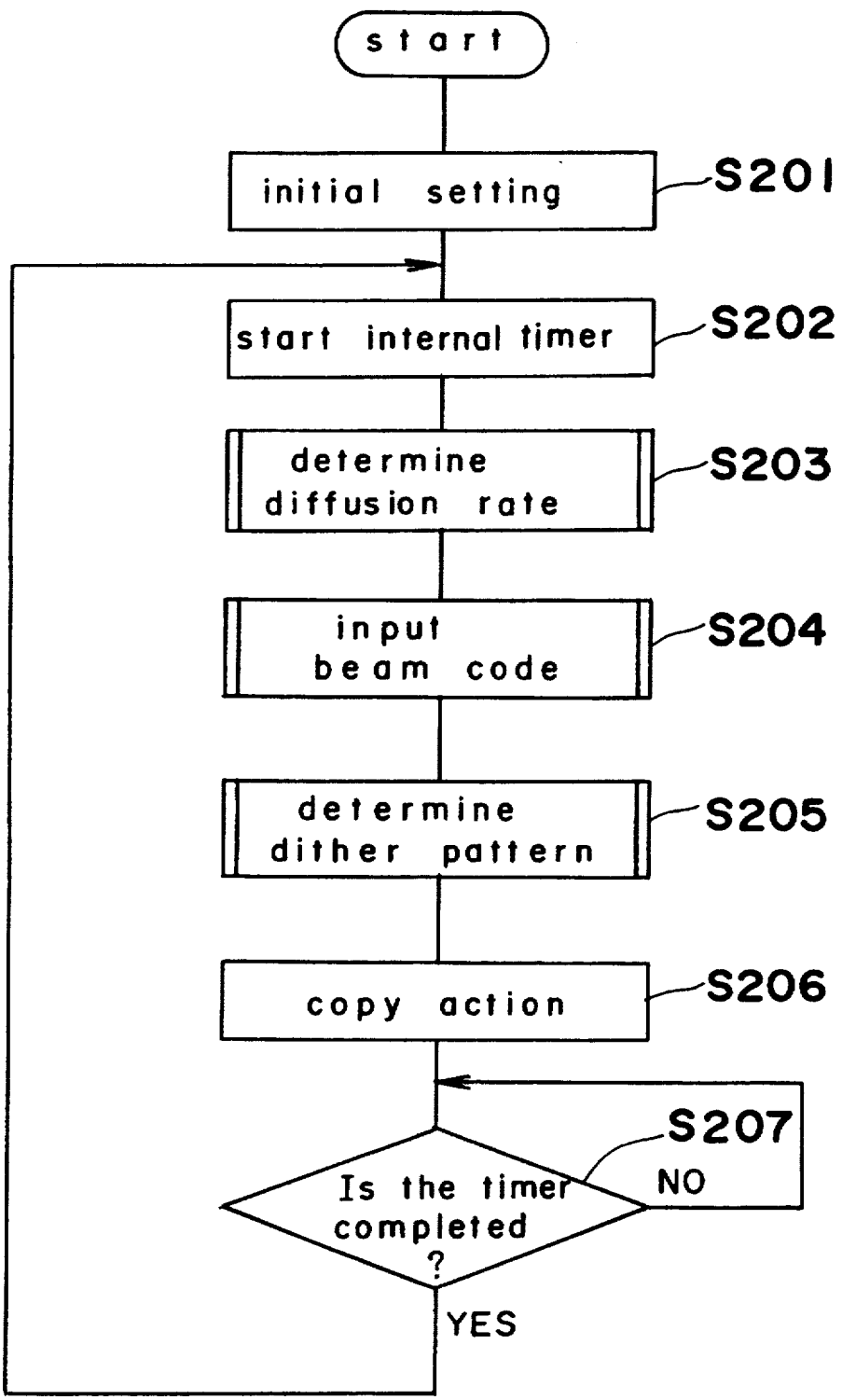
FIG. 26 is a flowchart of main control of the digital color copying machine of the fourth embodiment.

Next, the print control of the print controller 201 is explained. FIG. 26 shows the main flow of the print controller 201. First, the initial setting such as the initialization of parameters is performed (step S201). Next, an internal timer is started (step S202). Then, the diffusion constant is determined (step S203) and a beam code in correspondence with the beam size is inputted (step S204). Then, the dither pattern for gamma correction is determined (step S205). That is, a dither pattern in correspondence with the maximum image density is changed according to the diffusion constant $\alpha$ and the beam size so as to suppress a change in the gradation expression. Then, copy action is performed (step S206). After the end of the internal timer is detected (YES at step S207), the main flow returns to step S202. Except step S205, the processing of steps S201–S207 is the same as in the print control of the first embodiment (FIG. 16).

The dither pattern determination processing (step S205 in FIG. 26) is explained below, wherein the dither pattern is determined so as not to affect the gamma characteristic according to the values of the diffusion rate code P and the beam code C of laser beam of the laser diode 221. The dither pattern is determined beforehand for each combination of the beam code C and the diffusion rate code P by experiments.

In this embodiment, the diffusion rate code P and the beam code C change in five steps. Thus, by combining both codes, the dither pattern changes in twenty five steps. As explained above, the gamma characteristic rises sharper around the origin with decreasing diffusion rate code P or beam code C.

Figure 27:
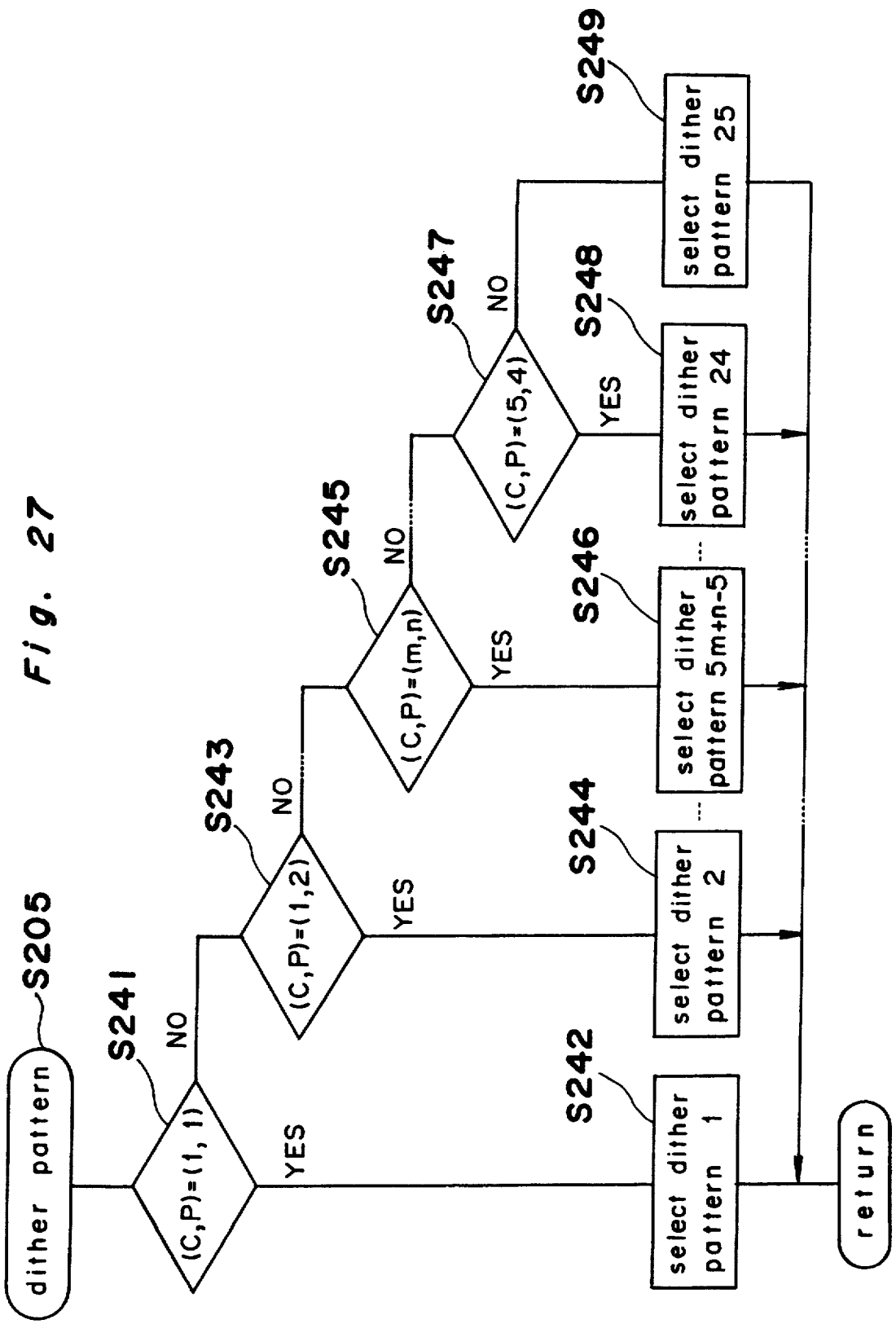
FIG. 27 is a flowchart of the dither pattern determination processing.
Figure 28A:
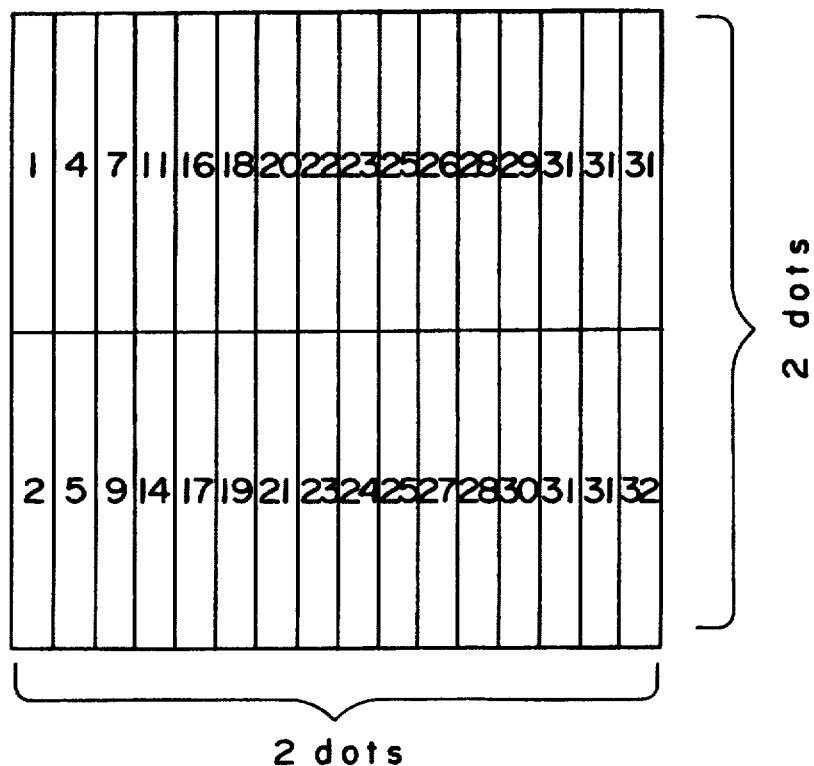
Figure 28B:
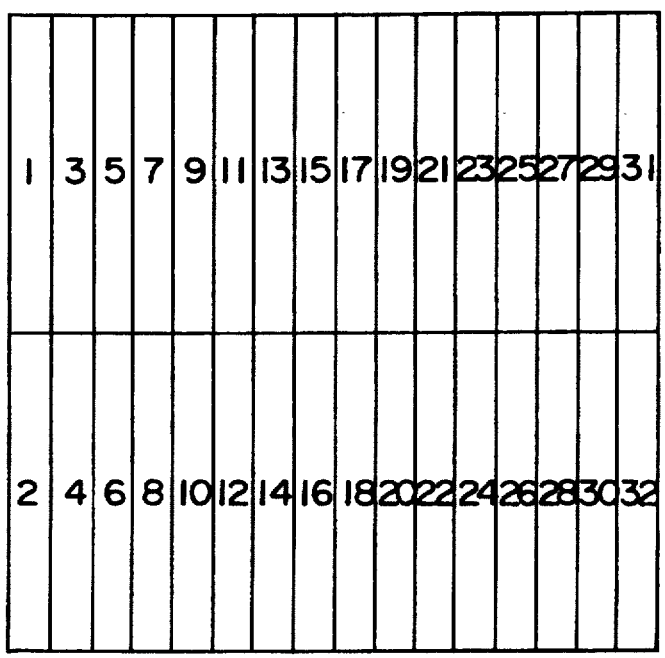

FIG. 27 shows the flow of the dither pattern determination processing. First, it is decided if both beam code C and diffusion rate code P are decided to be one or not (YES at step S241). This is a combination that the gamma characteristic rises most sharply around the origin, so that the dither pattern 1 for the mildest gamma correction is selected in order to compensate the sharp rise (step S242). When it is decided that the beam code C is one and the diffusion rate code P is two (YES at step S243), the dither matrix 2 is selected (step S244).

In other combinations, the laser intensity is determined similarly. When it is decided that the beam code C is m and the diffusion rate code P is n (YES at step S245), the dither pattern $5m+n-5$ is selected (step S246).

Then, finally when it is decided that the beam code C is five and the diffusion rate code P is four, the dither pattern 24 is selected (step S248); otherwise the dither pattern 25 which is the sharpest among all the dither patterns is selected so as to compensate the most mild gamma characteristic among the combinations.

By processing image data with the selected dither pattern, the change in the gamma characteristic is suppressed, and the appropriate gamma correction is performed.

FIGS. 28(a)–28(d) shows four examples of dither pattern of (2×2) dots used for the multi-level laser exposure method. Those dither patterns can express the gradation of $(2 \times 2 \times 8 + 1) = 33$ levels by using the modulation of the light-intensity at eight levels. Because the gradation is expressed not by the area gradation, but by the density gradation in the multi-level laser exposure method with use of the light-intensity modulation method, it is difficult to display the gradation. Then, in FIGS. 28(a)–28(d), the gradation is expressed by using strip-like shapes.

By using a dither pattern selected as explained above, a suitable gamma correction can be formed.

In the above-mentioned example, both diffusion rate code P and the beam code C are change in five steps. However, by using more steps than five, the gradation correction can be compensated more elaborately.

(E) diffusion rate and the intensity of laser beam

In a fifth embodiment of the present invention, the gradation correction is performed by changing the laser intensity according to only the diffusion rate.

The structure of a copying machine and image data are the same as in the first embodiment explained above with reference to FIGS. 13–15.

Figure 29:
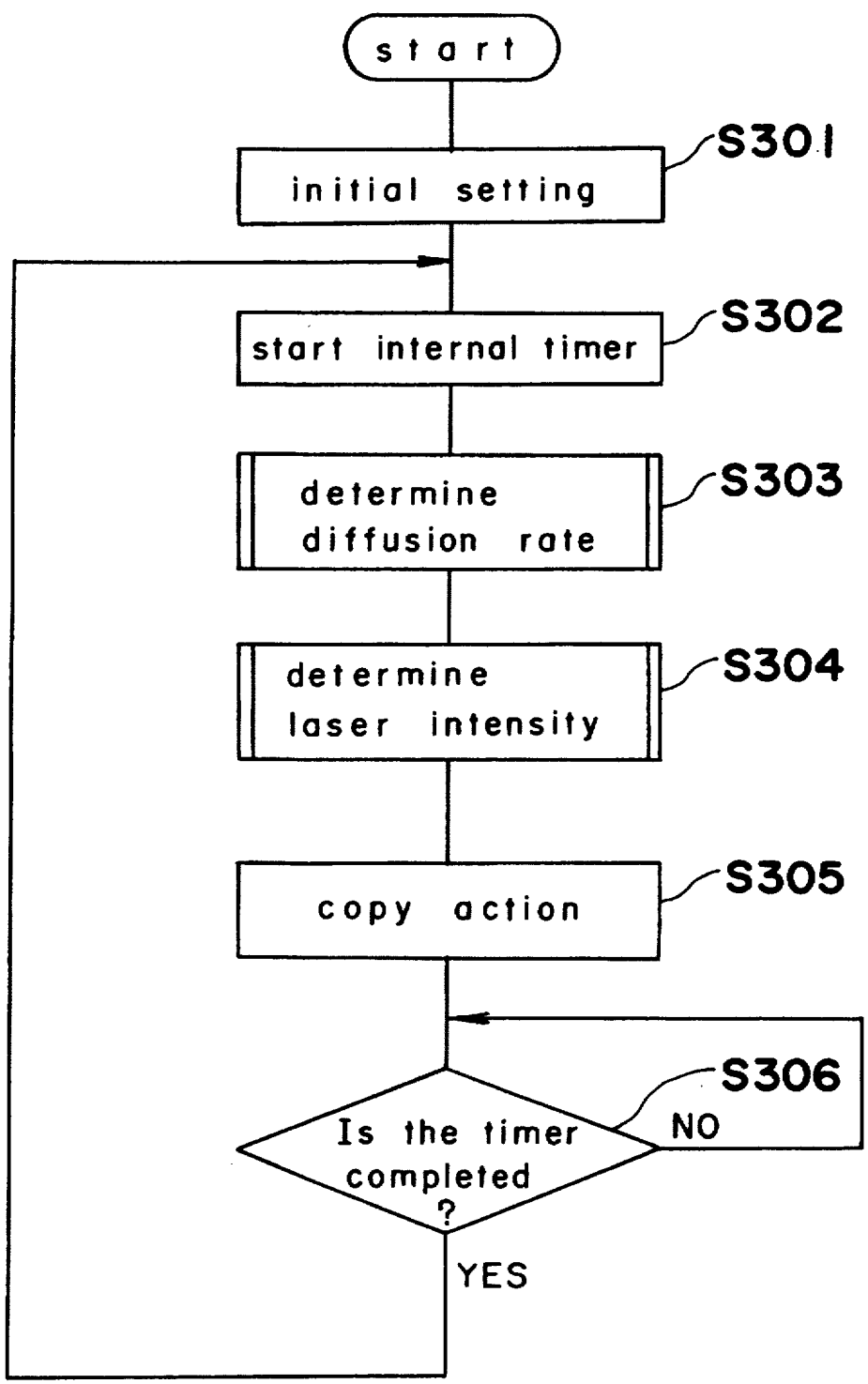
FIG. 29 is a flowchart of the main control of a digital copying machine of the fifth embodiment.

FIG. 29 shows the main flow of the print controller 201. This flow is the same as that of the first embodiment shown in FIG. 16 except that the beam code input processing is omitted because the beam size is not taken into account for correcting the gradation. First, the initial setting such as the initialization of parameters is performed (step S301). Next, an internal timer is started (step S302). Then, the diffusion rate is determined (step S303). Next, the light intensity of laser diode 221 is determined (step S304). That is, the light intensity in correspondence with the maximum image density (hereinafter referred to as maximum intensity) is selected according to the diffusion rate $\alpha$ so as to suppress a change in the gradation expression. (In case of the pulse width modulation method, the pulse width of laser beam is controlled under a constant light intensity.) Then, the copy action of the electrophotographic process is performed (step S305). After the end of the internal timer is detected (YES at step S306), the main flow returns to step S302. The processing of S301 to S306 is the same as in the counterparts of the first embodiment except the laser intensity determination processing (step S305).

Figure 30:
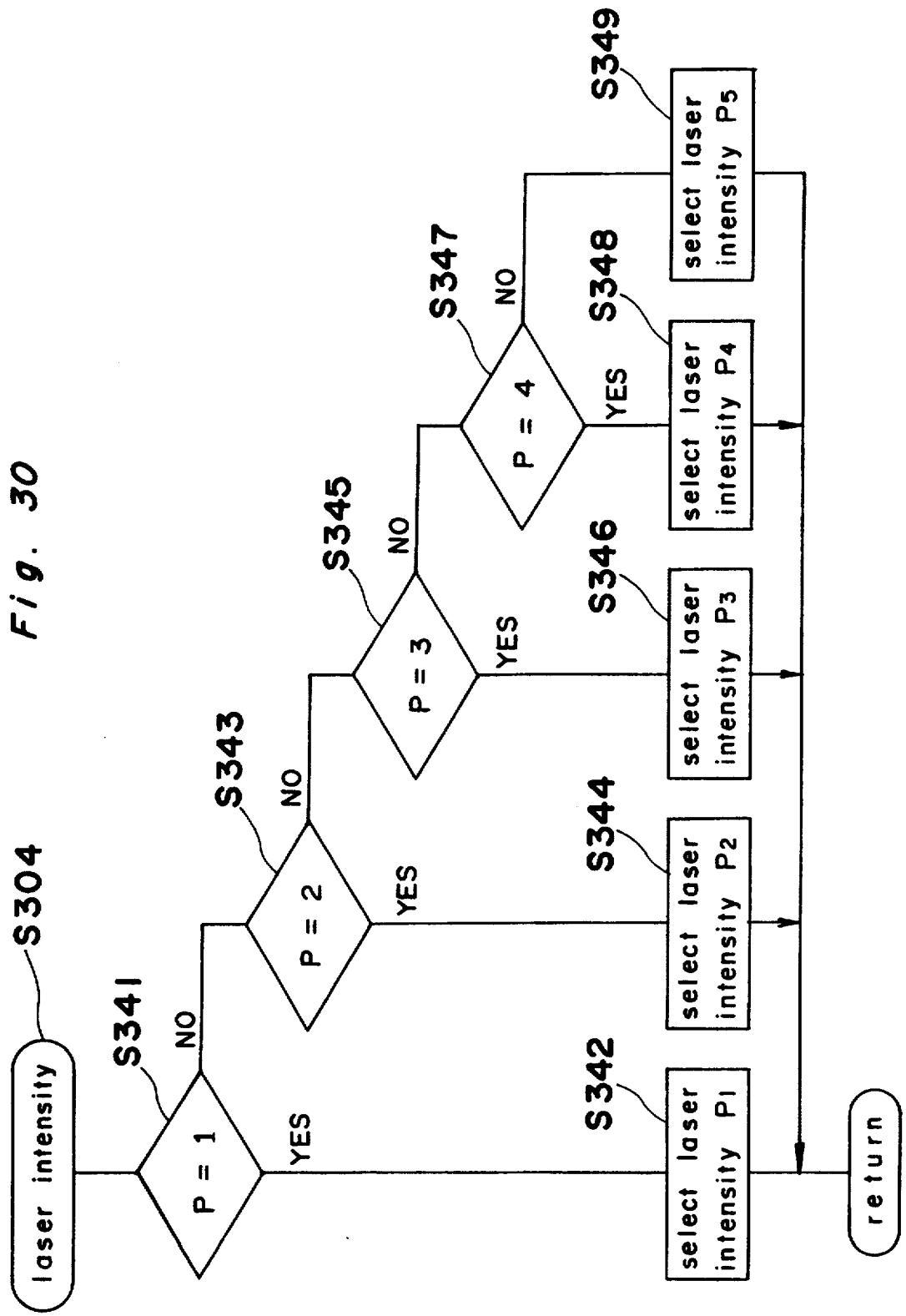
FIG. 30 is a flowchart of laser intensity determination processing.

FIG. 30 shows a flow of the laser intensity determination processing (step S304) for determining the laser intensity so as to correct the gamma characteristic affected by the diffusion rate which is expressed by the diffusion rate code P. The light intensity modulation method is used, so that the laser intensity means the maximum light intensity, as stated above.

In this embodiment, the diffusion rate code P has five steps, so that the laser intensity also has five values $P_1$–$P_5$ each appropriate to one of the steps. As explained above, the gamma characteristic rises sharper around the origin with decreasing diffusion rate code P. Optimum laser intensities $P_1$–$P_5$ which do not affect the gamma characteristic are determined beforehand by experiments, according to the diffusion rate code P.

First, if it is decided that the diffusion rate code P is one (YES at step S341), the lowest laser intensity $P_1$ is selected in order to correct the sharpest rise of the gamma characteristic (step S342). Similarly, if the diffusion rate code P is decided to be two (YES at step S343), a laser intensity $P_2$ is selected (step S344); if the diffusion rate code P is decided to be three (YES at step S345), a laser intensity $P_3$ is selected (step S346); if the diffusion rate code P is decided to be four (YES at step S347), a laser intensity $P_4$ is selected (step S348). If the diffusion rate code P is decided to be five (NO at step S347), the highest laser intensity $P_5$ is selected (step S349).

By exposing the photoconductor with the selected laser intensity in the copy action (step S305), the change in gamma characteristic can be suppressed to realize a suitable gamma correction.

In case of the pulse width modulation method wherein the light-emitting time is modulated while the laser intensity is kept constant, the laser intensity is controlled according to the diffusion rate in order to correct the gamma characteristic suitably. Further, this method of determining the suitable laser intensity is also applied to the multi-level dither method.

(F) diffusion rate and the gamma transformation table

In a sixth embodiment of the present invention, the gradation correction is performed by changing the gamma transformation table according to only the diffusion rate.

The structure of a copying machine and image data are the same as in the first embodiment explained above with reference to FIGS. 13–15.

Figure 31:
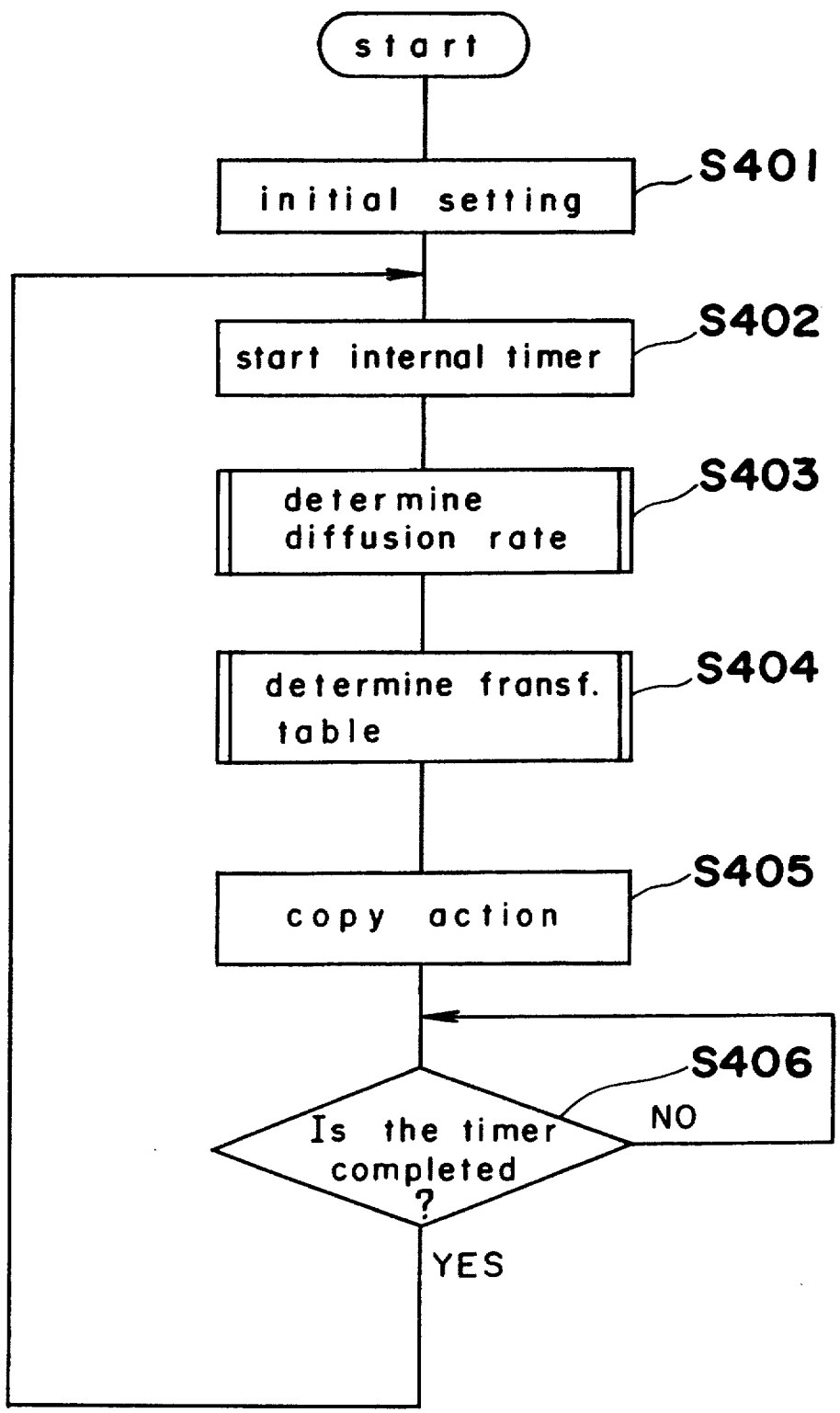
FIG. 31 is a flowchart of the main control of a digital copying machine of the sixth embodiment.

FIG. 31 shows the main flow of the print controller 201. This flow is the same as that of the first embodiment shown in FIG. 16 except that the beam code input processing is omitted because the beam size is not taken into account for correcting the gradation. First, the initial setting such as the initialization of parameters is performed (step S401). Next, an internal timer is started (step S402). Then, the diffusion constant is determined (step S403). Next, an appropriate transformation table for the gamma correction is determined (step S404). That is, a transformation table is selected according to the diffusion rate $\alpha$ so as to suppress a change in the gradation expression. Then, the copy action of the electrophotographic process is performed (step S405). After the completion of the internal timer is detected (YES at step S406), the main flow returns to step S402.

The processing S401 to S406 are the same as in the counterparts of the first embodiment except the transformation table determination processing (step S404).

Figure 32:
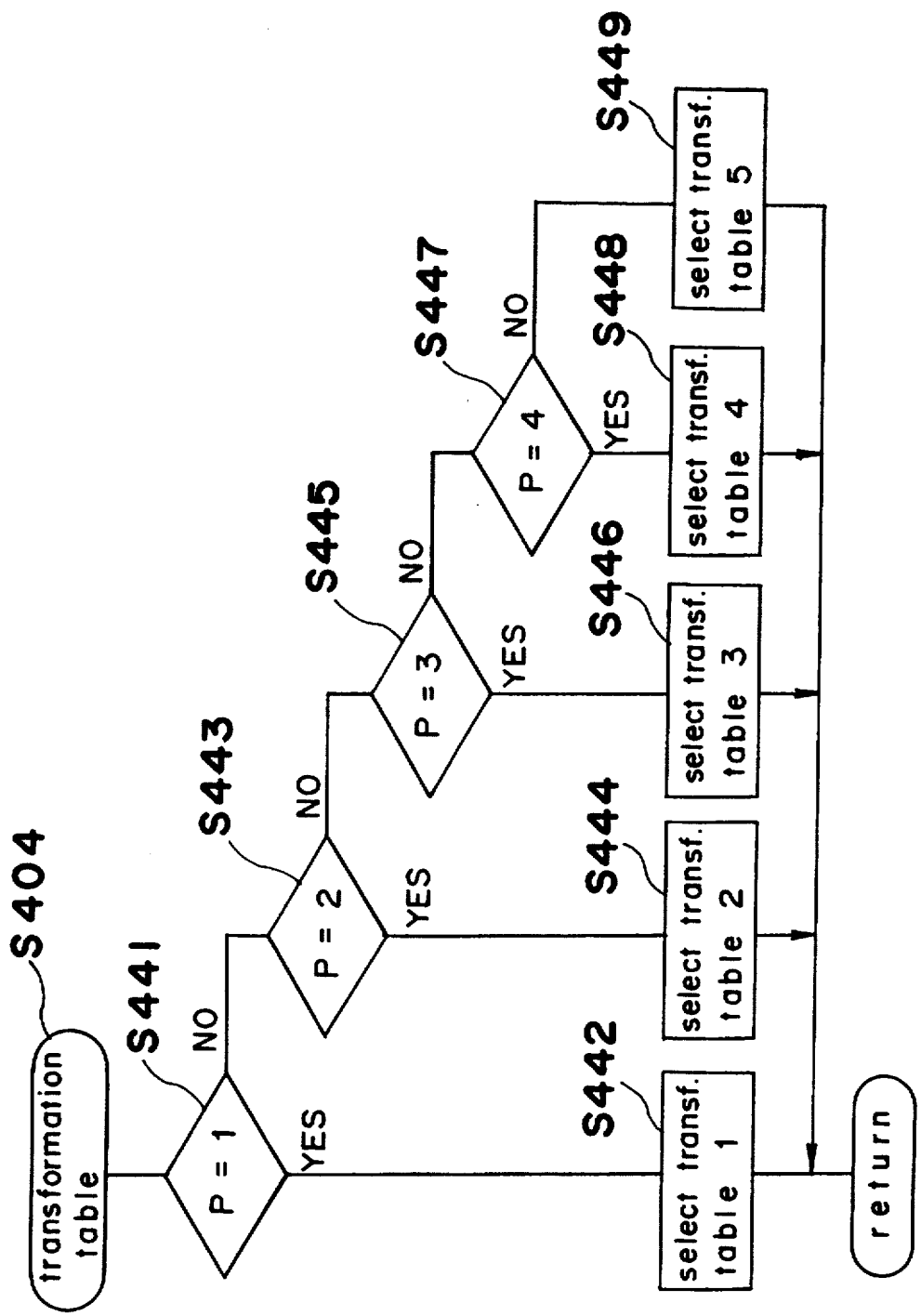
FIG. 32 is a flowchart of transformation table determination processing.

FIG. 32 shows a flow of the transformation table determination processing (step S404) for determining so as to correct the gamma characteristic affected by the diffusion rate which is expressed by the diffusion rate code P.

In this embodiment, the diffusion rate code P has five steps, so that five transformation tables are available each appropriate for one of the steps. As explained above, the gamma characteristic rises sharper around the origin with decreasing diffusion rate code P. The optimum transformation tables 1–5 which do not affect the gamma characteristic are determined beforehand by experiments, according to the beam code.

First, if it is decided that the diffusion rate code P is one (YES at step S441), a transformation table 1 is selected in order to correct the sharpest rise of the gamma characteristic (step S442). Similarly, if the diffusion rate code P is decided to be two (YES at step S443), a tranformation table 2 is selected (step S444); if the diffusion rate code P is decided to be three (YES at step S445), a transformation table 3 is selected (step S446); if the diffusion rate code P is decided to be four (YES at step S447), a transformation table 4 is selected (step S448). If the diffusion rate code P is decided to be five (NO at step S447), a transformation table 5 is selected (step S449).

By exposing the photoconductor by using the selected transformation table in the copy action (step S405), the change in gamma characteristic can be suppressed to realize a suitable gamma correction.

This gradation correction method can also be applied to the pulse width modulation method or the like.

(G) diffusion rate and dither pattern

In a seventh embodiment of the present invention, the gradation correction is performed by changing the dither pattern according to only the diffusion rate.

The structure of a copying machine and image data are the same as in the first embodiment explained above with reference to FIGS. 13–15.

Figure 33:
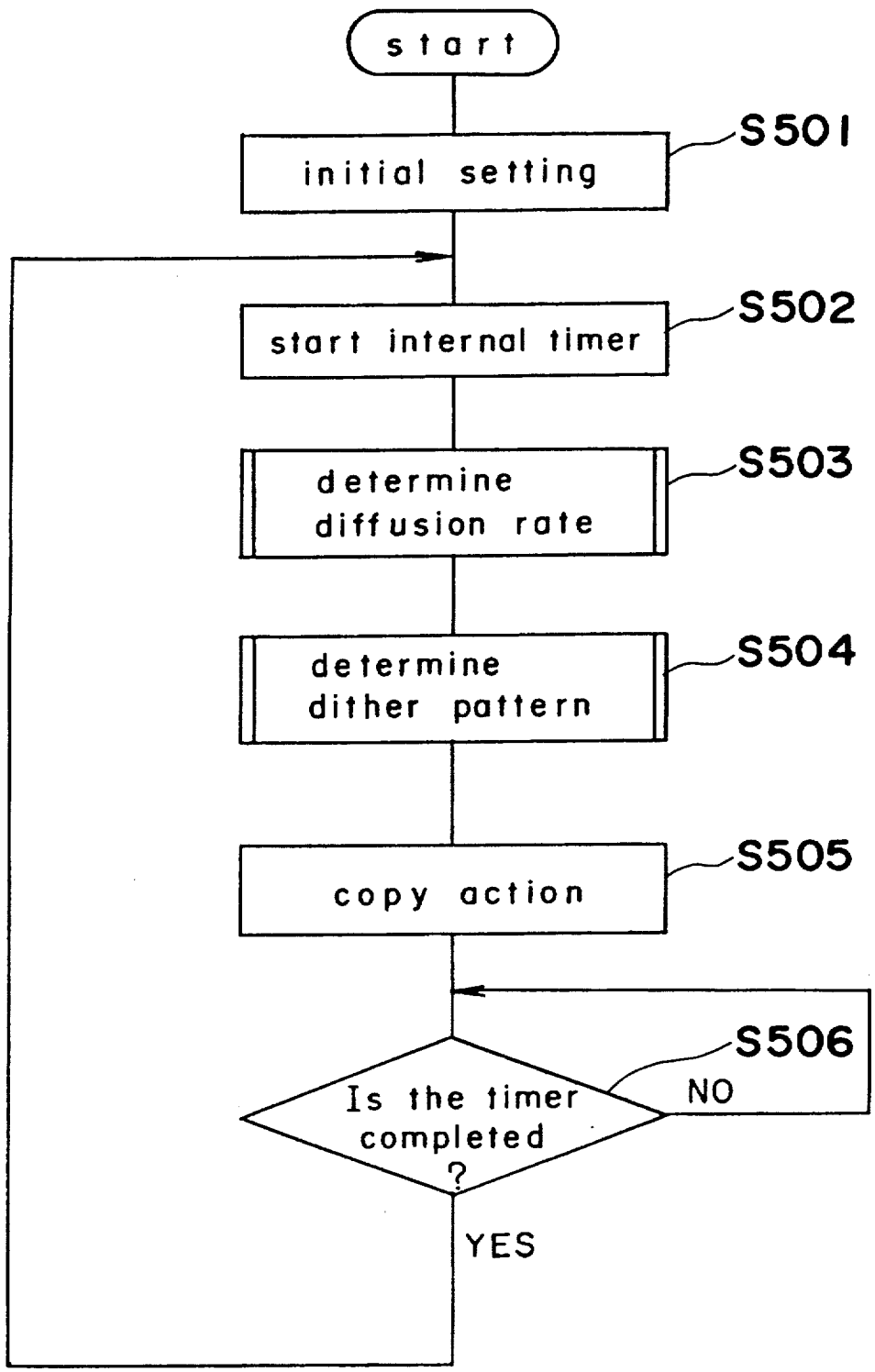
FIG. 33 is a flowchart of the main control of a digital copying machine of the seventh embodiment.

FIG. 33 shows the main flow of the print controller 201. This flow is the same as that of the first embodiment shown in FIG. 16 except that the beam code input processing is omitted because the beam size is not taken into account for correcting the gradation. First, the initial setting such as the initialization of parameters is performed (step S501). Next, an internal timer is started (step S502). Then, the diffusion rate is determined (step S503). Next, a dither pattern appropriate for the gamma correction is selected according to the diffusion rate α so as to suppress a change in the gradation expression (step S504). Then, the copy action of the electrophotographic process is performed (step S505). After the completion of the internal timer is detected (YES at step S506), the main flow returns to step S502. The processing S501 to S506 are the same as in the counterparts of the first embodiment except the laser intensity determination processing (step S505).

Figure 34:
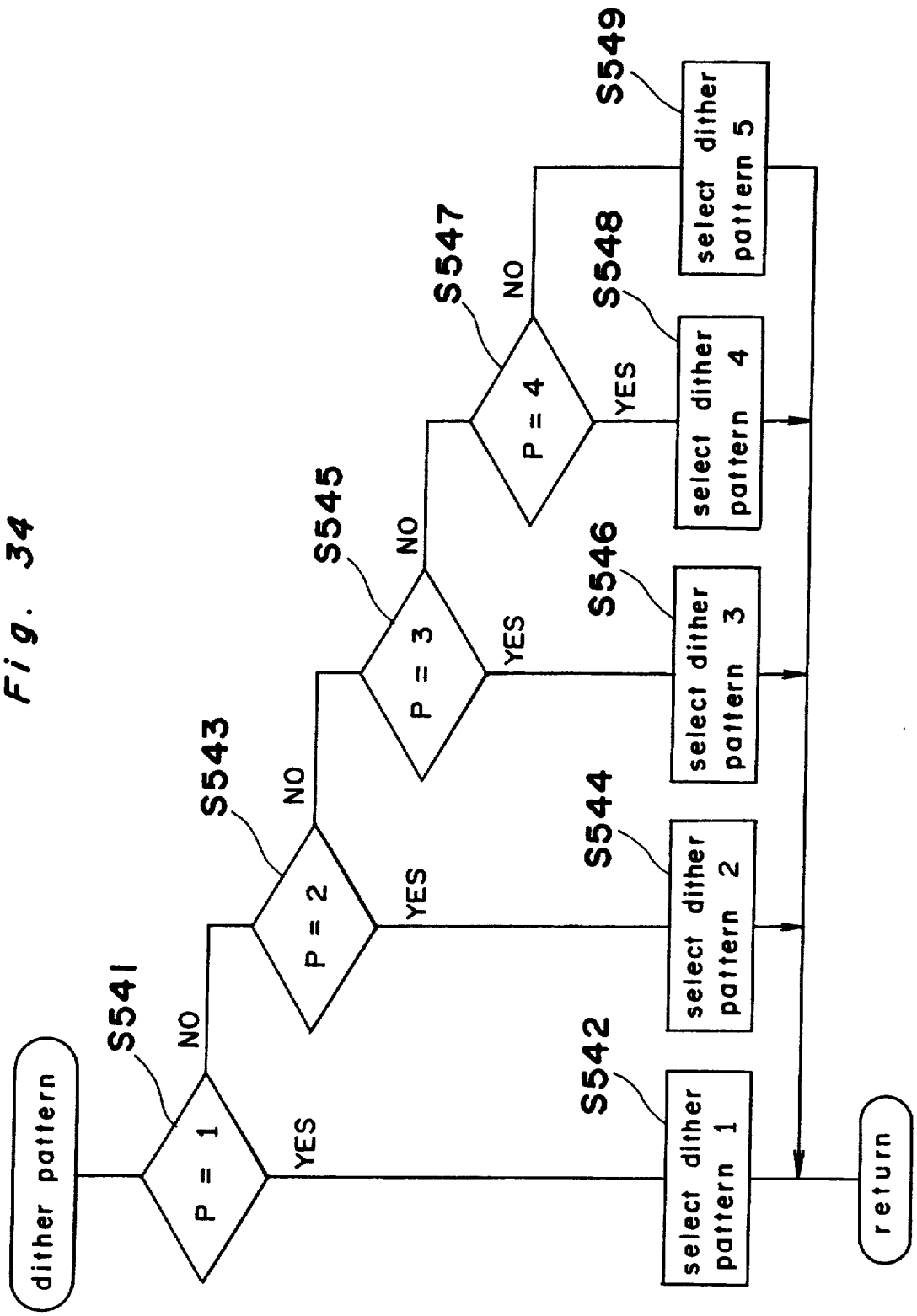
FIG. 34 is a flowchart of dither pattern determination processing.

FIG. 34 shows a flow of the dither pattern determination processing (step S504) for determining a dither pattern so as to correct the gamma characteristic affected by the diffusion rate which is expressed by the diffusion rate code P. Thus, the threshold values of the dither method is changed according to the diffusion rate code P in order to correct the gamma characteristic.

In this embodiment, the diffusion rate code P has five steps, so that the five dither patterns are available each appropriate for one of the steps. As explained above, the gamma characteristic rises sharper around the origin with decreasing diffusion rate code P. Optimum dither patterns 1–5 which do not affect the gamma characteristic are determined beforehand by experiments, according to the beam code.

First, if it is decided that the diffusion rate code P is one (YES at step S541), a first dither pattern 1 is selected in order to correct the sharpest rise of the gamma characteristic (step S542). Similarly, if the diffusion rate code P is decided to be two (YES at step S543), a second dither pattern 2 is selected (step S544); if the diffusion rate code P is decided to be three (YES at step S545), a third dither pattern is selected (step S546); if the diffusion rate code P is decided to be four (YES at step S547), a fourth dither pattern 4 is selected (step S548). If the diffusion rate code P is decided to be five (NO at step S547), a fifth dither pattern 5 is selected (step S549).

By exposing the photoconductor with the selected laser intensity in the copy action (step S505), the change in gamma characteristic can be suppressed to realize a suitable gamma correction.

(H) beam size and the intensity of laser beam

In an eighth embodiment of the present invention, the gradation correction is performed by changing the laser intensity according to only the beam size of laser diode.

The structure of a copying machine and image data are the same as in the first embodiment explained above with reference to FIGS. 13–15.

Figure 35:
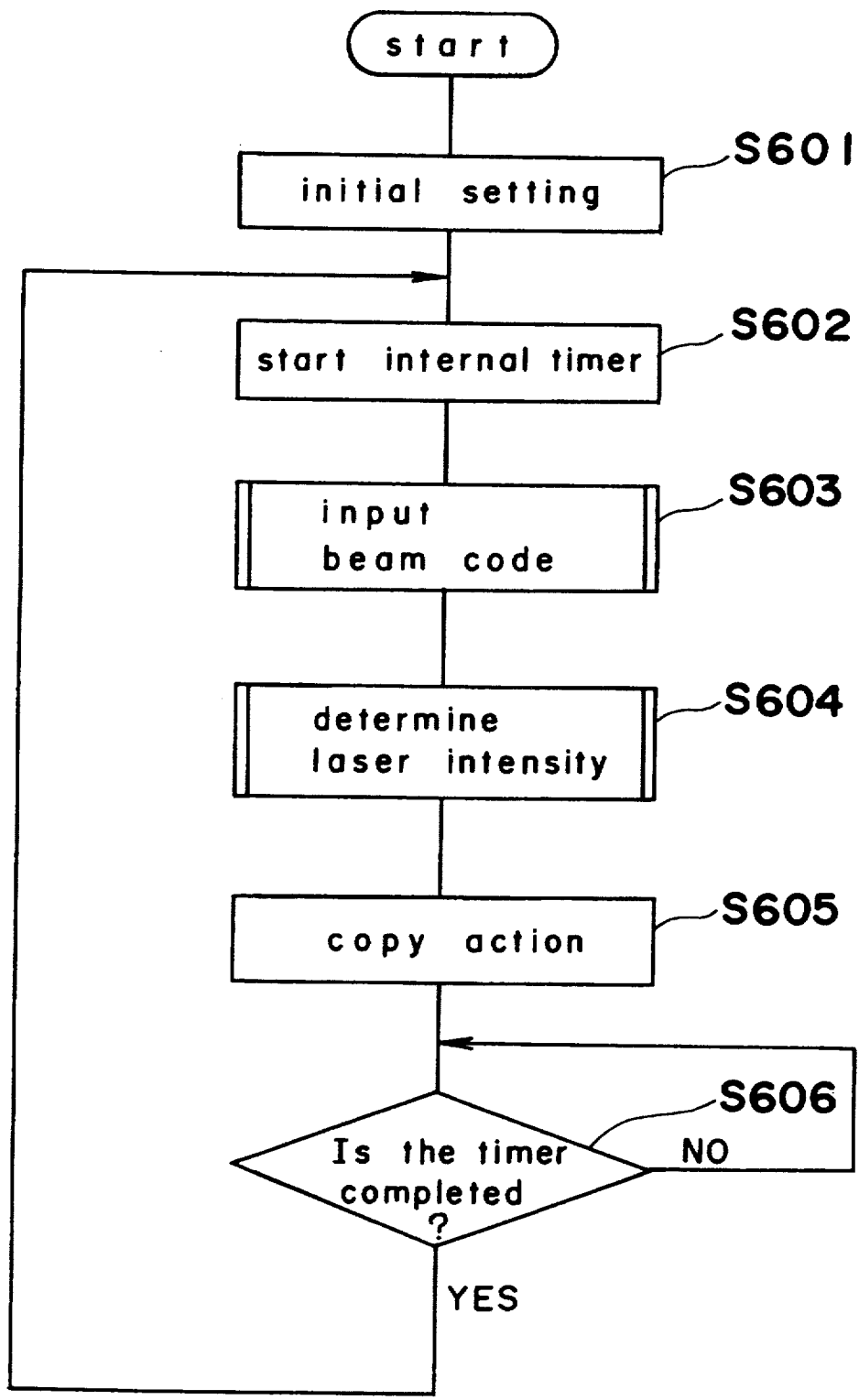
FIG. 35 is a flowchart of the main control of a digital copying machine of the eighth embodiment.

FIG. 35 shows the main flow of the print controller 201. This flow is the same as that of the first embodiment shown in FIG. 16 except that the diffusion rate determination processing is omitted because the diffusion rate is not taken into account for correcting the gradation. First, the initial setting such as the initialization of parameters is performed (step S601). Next, an internal timer is started (step S602). Then, the beam code C inputted (step S603).

Next, the light intensity of laser diode 221 is determined (step S604). That is, the light intensity in correspondence with the maximum image density (hereinafter referred to as maximum intensity) is selected according to the diffusion rate α so as to suppress a change in the gradation expression. In case of the pulse width modulation method, the laser light intensity is controlled. Then, the copy action of the electrophotographic process is performed (step S605). After the completion of the internal timer is detected (YES at step S606), the main flow returns to step S602. The processing S601 to S606 are the same as in the counterparts of the first embodiment except the laser intensity determination processing (step S605).

Figure 36:
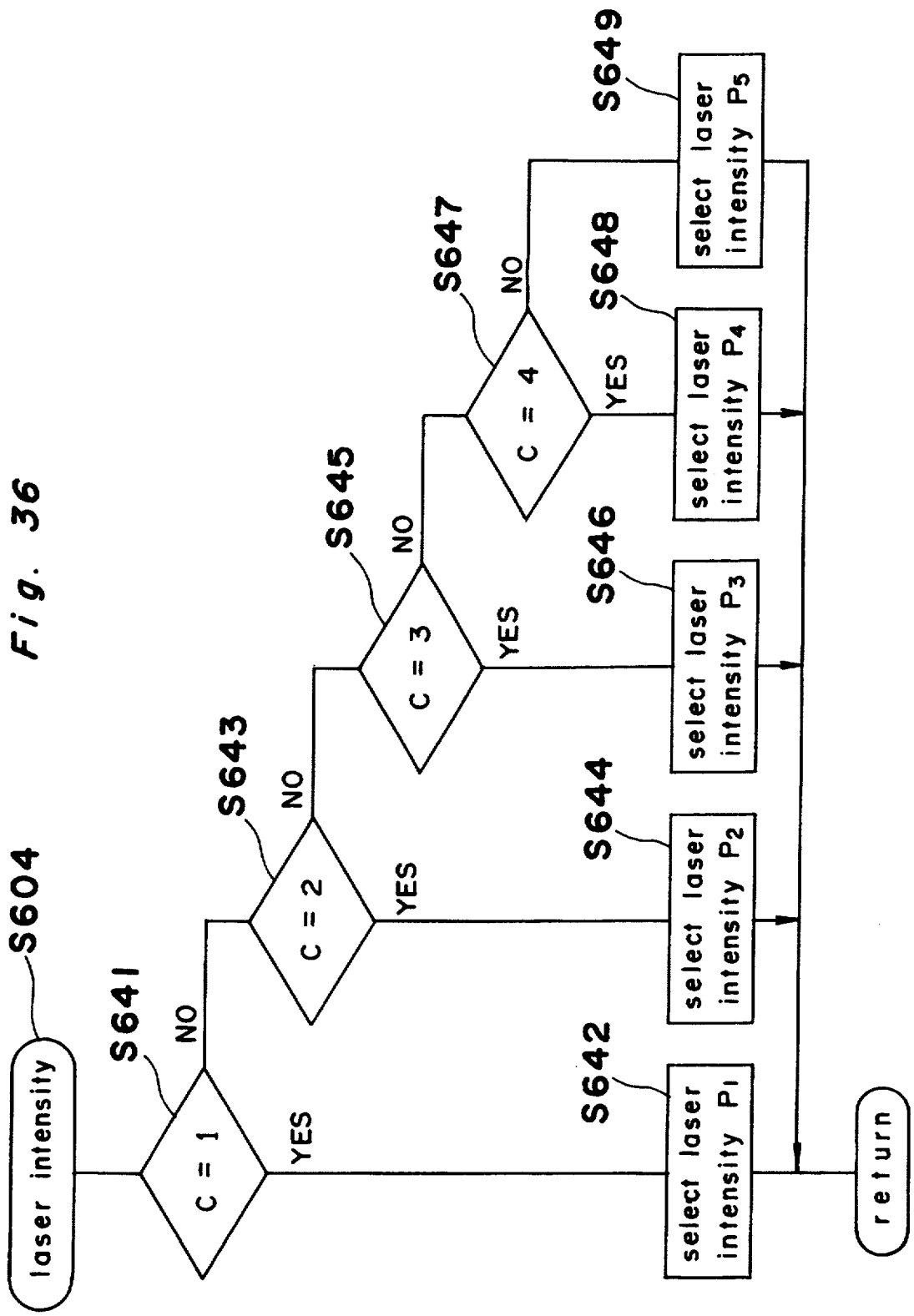
FIG. 36 is a flowchart of the laser intensity determination processing.

FIG. 36 shows a flow of the laser intensity determination processing (step S604) for determining the laser intensity so as to correct the gamma characteristic affected by the size of laser beam which is expressed by the beam size code C. The light intensity modulation method is used, and the laser intensity means the maximum light intensity.

In this embodiment, the beam code C has five steps, so that the laser intensity also has five values P1–P5 each appropriate to one of the steps. As explained above, the gamma characteristic rises sharper around the origin with decreasing beam code C. The optimum laser intensities P1–P5 which do not affect the gamma characteristic are determined beforehand by experiments, according to the beam code C.

First, if it is decided that the beam code C is one (YES at step S341), the lowest laser intensity $P_1$ is selected in order to correct the sharpest rise of the gamma characteristic (step S641). Similarly, if the beam code C is decided to be two (YES at step S643), a laser intensity $P_2$ is selected (step S644); if the beam code C is decided to be three (YES at step S645), a laser intensity $P_3$ is selected (step S646); if the beam code C is decided to be four (YES at step S647), a laser intensity $P_4$ is selected (step S348). If the beam code C is decided to be five (NO at step S647), the height laser intensity $P_5$ is selected (step S649).

By exposing the photoconductor with the selected laser intensity in the copy action (step S605), the change in gamma characteristic can be suppressed to realize a suitable gamma correction.

In case of the pulse width modulation method wherein the light-emitting time is modulated while the laser intensity is kept constant, the quantity of light is controlled by changing the light-emitting time according to the diffusion rate in order to correct the gamma characteristic suitably. Further, this method of determining the suitable laser intensity is also applied to the multi-level dither method.

(I) beam size and gamma transformation table

In a ninth embodiment of the present invention, the gradation correction is performed by changing the gamma transformation table according to only the beam size of laser diode.

The structure of a copying machine and image data are the same as in the first embodiment explained above with reference to FIGS. 13-15.

Figure 37:
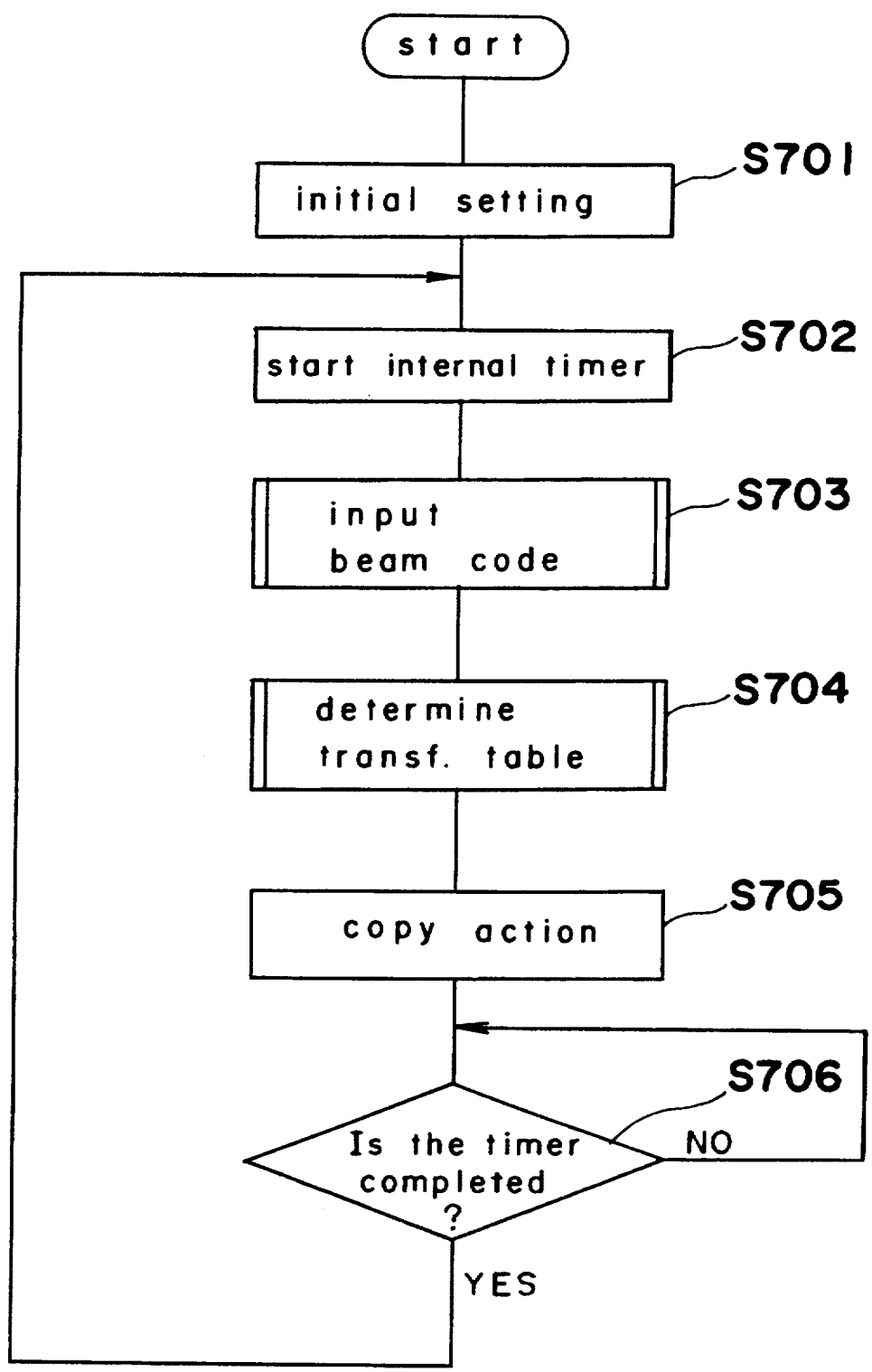
FIG. 37 is a flowchart of the main control of a digital copying machine of the ninth embodiment.

FIG. 37 shows the main flow of the print controller 201. This flow is the same as that of the first embodiment shown in FIG. 16 except that the diffusion rate determination input processing is omitted because the diffusion rate is not taken into account for correcting the gradation. First, the initial setting such as the initialization of parameters is performed (step S701). Next, an internal timer is started (step S702). Then, the beam code C is inputted (step S703). Next, an appropriate transformation table for the gamma correction is determined (step S704). That is, a transformation table is selected according to the diffusion rate α so as to suppress a change in the gradation expression. Then, the copy action of the electrophotographic process is performed (step S705). After the completion of the internal timer is detected (YES at step S706), the main flow returns to step S702.

The processing of S701 to S706 are the same as in the counterparts of the first embodiment except the transformation table determination processing (step S704).

Figure 38:
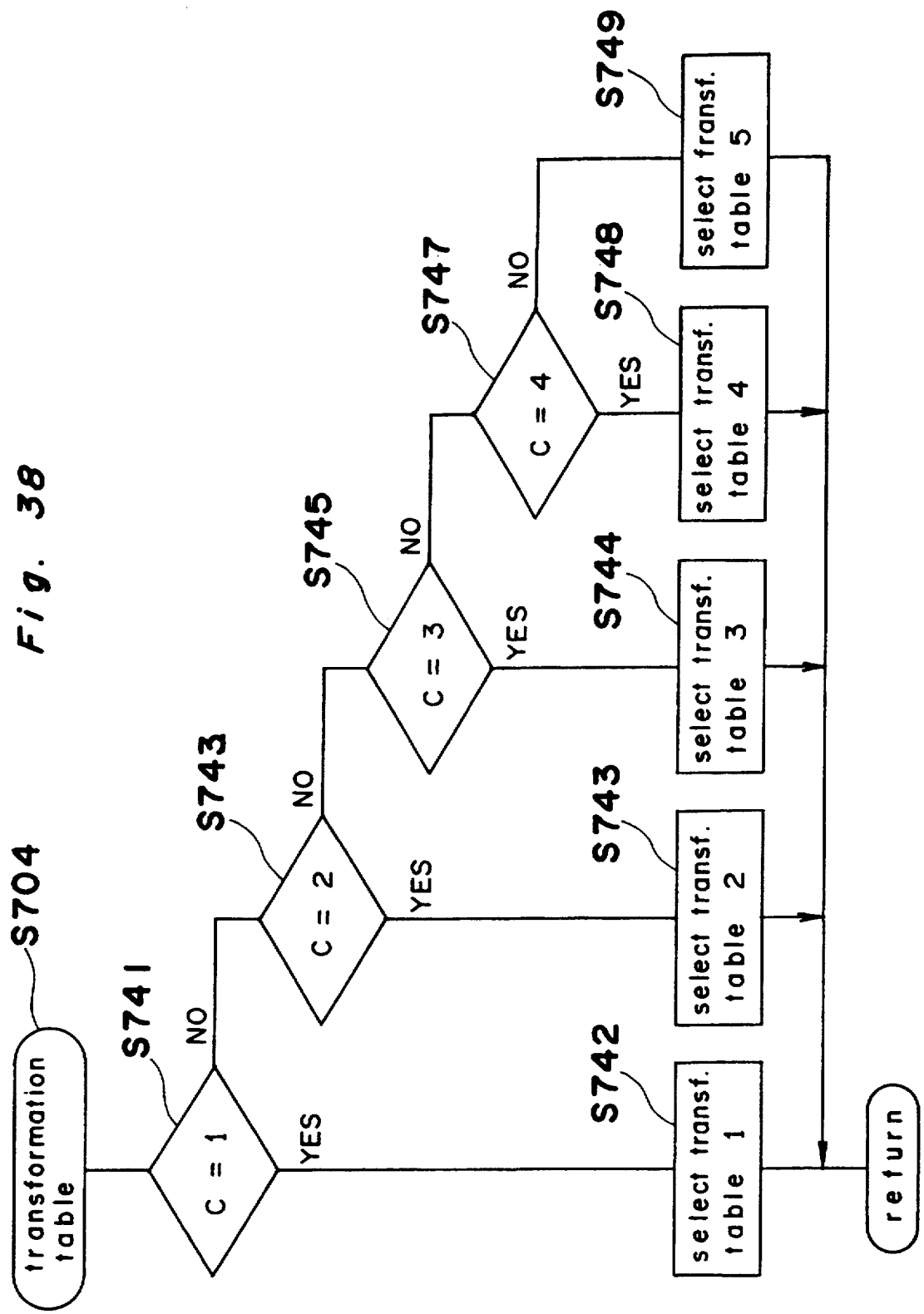
FIG. 38 is a flowchart of transformation table determination processing.

FIG. 38 shows a flow of the transformation table determination processing (step S704) for determining a transformation table so as to correct the gamma characteristic affected by the diffusion rate which is expressed by the beam code C.

In this embodiment, the beam code C has five steps, so that five transformation tables are available each appropriate to one of the steps. As explained above, the gamma characteristic rises sharper around the origin with decreasing beam code C. Optimum transformation tables 1-5 which do not affect the gamma characteristic are determined beforehand by experiments, according to the beam code C.

First, if it is decided that the beam code C is one (YES at step S741), a transformation table 1 is selected in order to correct the sharpest rise of the gamma characteristic (step S742). Similarly, if the beam code C is decided to be two (YES at step S743), a transformation table 2 is selected (step S744); if the beam code C is decided to be three (YES at step S745), a transformation table 3 is selected (step S746); if the beam code C is decided to be four (YES at step S747), a transformation table 4 is selected (step S748). If the beam code c is decided to be five (NO at step S747), a transformation table 5 is selected (step S749).

By exposing the photoconductor with the selected laser intensity in the copy action (step S305), the change in gamma characteristic can be suppressed to realize a suitable gamma correction.

(J) beam size and dither pattern

In a tenth embodiment of the present invention, the gradation correction is performed by changing the dither pattern according to only the beam size of laser diode.

The structure of a copying machine and image data are the same as in the first embodiment explained above with reference to FIGS. 13-15.

Figure 39:
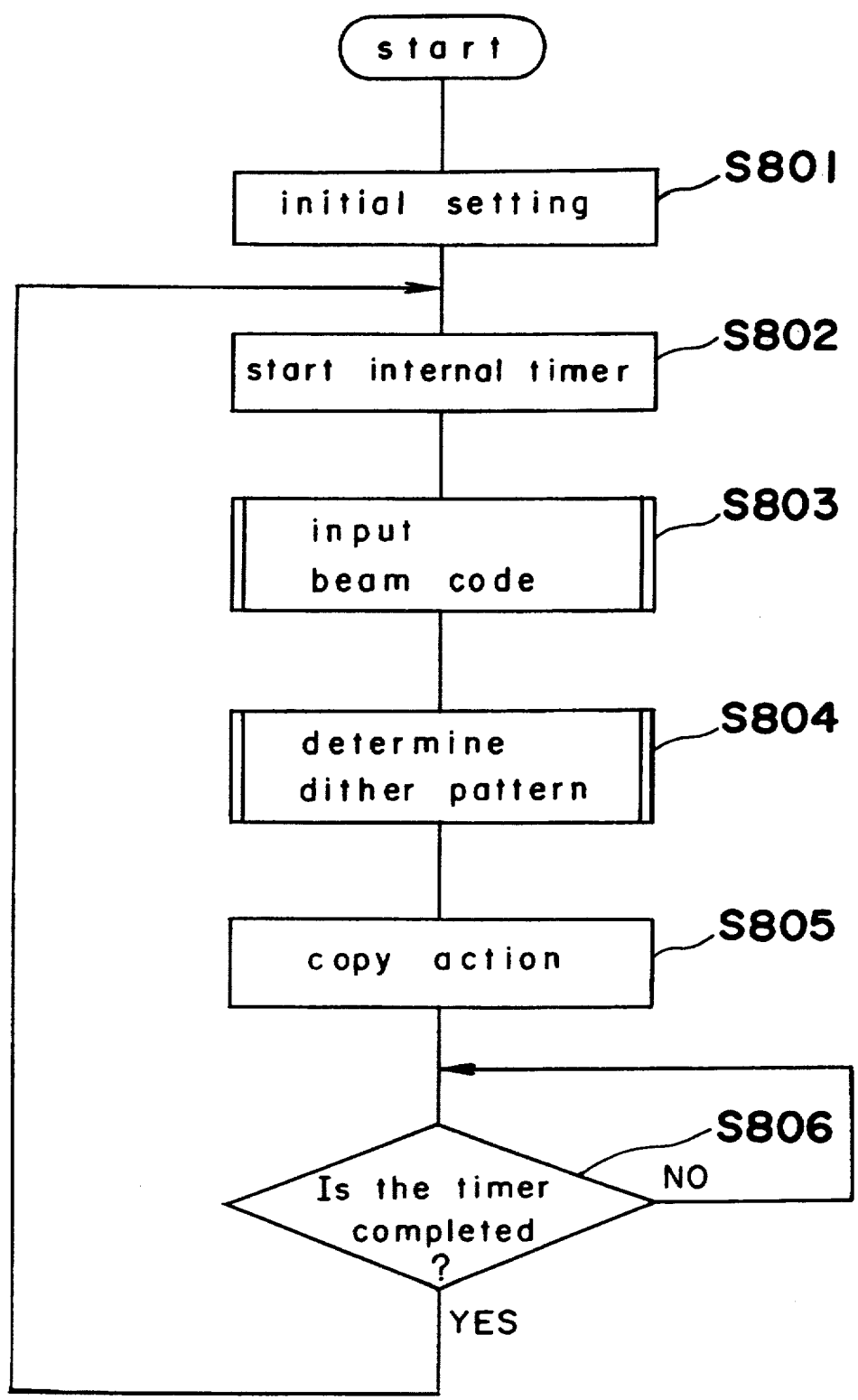
FIG. 39 is a flowchart of the main control of a digital copying machine of the tenth embodiment.

FIG. 39 shows the main flow of the print controller 201. This flow is the same as that of the first embodiment shown in FIG. 16 except that the diffusion rate determination processing is omitted because the diffusion rate is not taken into account for correcting the gradation. First, the initial setting such as the initialization of parameters is performed (step S801). Next, an internal timer is started (step S802). Then, the beam code C is inputted (step S 803).

Next, a dither pattern appropriate for the gamma correction is selected according to the diffusion rate α so as to suppress a change in the gradation expression (step S804). Then, the copy action of the electrophotographic process is performed (step S805). After the completion of the internal timer is detected (YES at step S806), the main flow returns to step S802.

The processing S801 to S806 are the same as in the counterparts of the first and second embodiments except the laser intensity determination processing (step S805).

Figure 40:
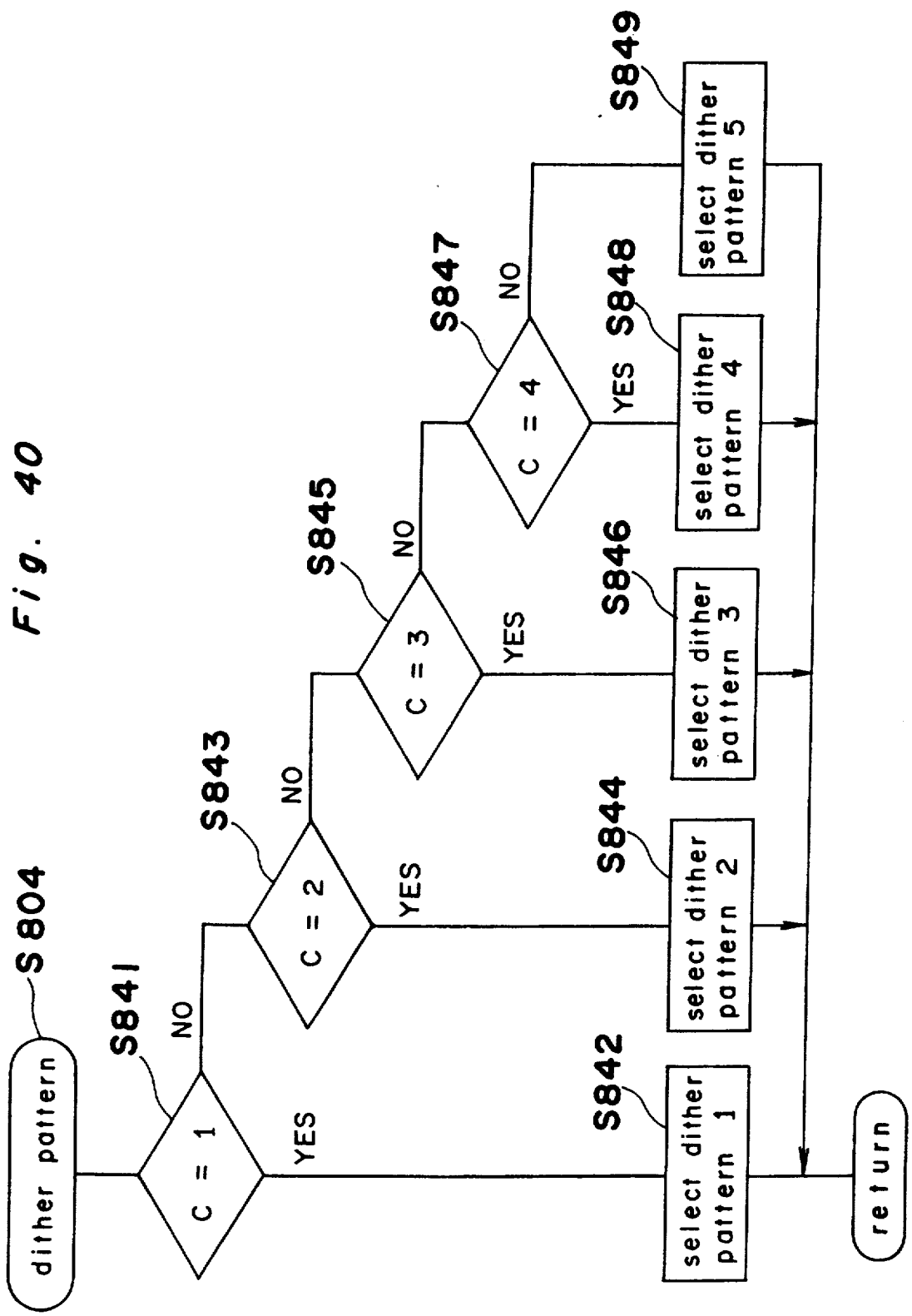
FIG. 40 is a flowchart of dither pattern determination processing.

FIG. 40 shows a flow of the dither pattern determination processing (step S804) for determining a dither pattern so as to correct the gamma characteristic affected by the diffusion rate which is expressed by the beam code C. Thus, the threshold values of the dither method is changed according to the beam code C in order to correct the gamma characteristic.

In this embodiment, the beam code C has five steps, so that the five dither patterns are available each appropriate for one of the steps. As explained above, the gamma characteristic rises sharper around the origin with decreasing beam code C. The optimum dither patterns 1-5 which do not affect the gamma characteristic are determined beforehand by experiments, according to the beam code C.

First, if it is decided that the beam code C is one (YES at step S841), a first dither pattern 1 is selected in order to correct the sharpest rise of the gamma characteristic (step S842). Similarly, if the beam code C is decided to be two (YES at step S843), a second dither pattern 2 is selected (step S844); if the beam code C is decided to be three (YES at step S845), a third dither pattern 3 is selected (step S846); if the beam code C is decided to be four (YES at step S847), a fourth dither pattern 4 is selected (step S848). If the beam code C is decided to be five (NO at step S847), a fifth dither pattern 5 is selected (step S849).

By exposing the photoconductor with the selected laser intensity in the copy action (step S805), the change in gamma characteristic can be suppressed to realize a suitable gamma correction.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An apparatus for forming an image, comprising:
   (a) a photoconductor layer;
   (b) a charger which sensitizes said photoconductor layer to a desired initial electric potential;
   (c) transformation means for transforming a digital signal to an analog signal, wherein both said analog signal and said digital signal represent a density of a pixel of an image to be formed;
   (d) amplification means for amplifying the analog signal with a predetermined gain;
   (e) exposure means for exposing said photoconductor layer sensitized to the predetermined initial electric potential to form an electrostatic latent image;
   (f) first exposure control means for controlling an intensity of light illuminating said photoconductor layer by said exposure means in correspondence with the analog signal amplified by said amplification means;
   (g) a development device for developing said electrostatic latent image formed on said photoconductor layer to form a toner image;
   (h) second exposure control means for controlling said exposure means so as to expose a part of said photoconductor layer to a predetermined intensity of light;
   (i) detection means for detecting a surface electric potential of said part of said photoconductor layer exposed to the predetermined intensity of light; and
   (i) means for changing the gain of said amplification means in correspondence with the surface electric potential of the photoconductor layer detected by the detection means.

2. An apparatus for forming an image comprising:
   (a) a photoconductor layer;
   (b) a charger which sensitizes said photoconductor layer to a desired initial electrode potential;
   (c) exposure means for exposing said photoconductor layer sensitized to the desired initial electric potential to form an electrostatic latent image;
   (d) first exposure control means for controlling said exposure means so as to expose a part of said photoconductor layer to a predetermined quantity of light;
   (e) detection means for detecting a surface electric potential of said part of said photoconductor layer exposed to the predetermined quantity of light;
   (f) memory means for storing a plurality of gradation correction data;
   (g) selection means for selecting one of the plurality of gradation correction data stored in said memory means in correspondence with the surface electric potential of said photoconductor layer detected by said detection means;
   (h) gamma transformation means for correcting, on the basis of the selected gradation correction data, an image density signal representing a density of each pixel of an image to be formed;
   (i) second exposure control means for controlling the predetermined quantity of light illuminating said photoconductor layer by said exposure means in correspondence with the image density signal which is corrected by said gamma transformation means; and
   (j) a development device for developing said electrostatic latent image formed on the photoconductor layer to form a toner image.

3. An apparatus according to claim 2, wherein said second exposure control means controls an intensity of light illuminating said photoconductor by said exposure means.

4. An apparatus for forming an image comprising:
   (a) a photoconductor layer supported on a support member which has code information representing a sensitive characteristic of the photoconductor layer, said photoconductor layer and said support member being integrally exchangeable;
   (b) a charger which sensitizes said photoconductor layer to a desired initial electric potential;
   (c) converting means for converting a digital signal to an analog signal, said digital signal representing a density of each pixel of an image to be formed;
   (d) amplification means for amplifying said analog signal at a predetermined gain;
   (e) exposure means for exposing said photoconductor layer, which is sensitized to the initial electric potential to form an electrostatic latent image, to a quantity of light in correspondence with a signal supplied from said amplification means;
   (f) a development device for developing said electrostatic latent image formed on said photoconductor layer to form a toner image;
   (g) read means for reading the code information put on said support member of said photoconductor layer; and
   (h) change means for changing the gain of said amplification means in correspondence with said code information read by said read means.

5. An apparatus according to claim 4, wherein said exposure means illuminate said photoconductor layer at a light intensity in correspondence with an output signal received from said amplification means.

6. An apparatus for forming an image comprising:
   (a) a photoconductor layer supported on a support member which has code information representing a sensitive characteristic of the photoconductor layer, said photoconductor layer and said support member being integrally exchangeable;
   (b) a charger which sensitizes said photoconductor layer to a desired initial electric potential;
   (c) exposure means for exposing said photoconduction layer sensitized to the initial electric potential to form an electrostatic latent image;
   (d) control means for controlling a quantity of light for exposure of said photoconductor layer by said exposure means in correspondence with an image density signal which represents a density of each pixel of an image to be formed;

(e) a development device which develops said electrostatic latent image formed on said photoconductor layer to form a toner image;

(f) memory means for storing a plurality of gradation correction data;

(g) read means for reading the code information put on said support member of said photoconductor layer; and (h) selection means for selecting one of said plurality of gradation correction data stored in said means in correspondence with the code information read by said read means;

wherein said exposure control means controls the quantity light for exposure on the basis of the gradation correction data selected by said selection means.

7. An apparatus according to claim 6, wherein said control means controls an intensity of light generated by said exposure means according to said image density signal.

8. An apparatus for forming an image comprising:
(a) a photoconductor layer;
(b) a charger which sensitizes said photoconductor layer to a desired initial electric potential;
(c) exposure means for exposing said photoconductor layer sensitized to the initial electric potential to form an electrostatic latent image;
(d) memory means for storing a dither matrix which includes a plurality of threshold value data;
(e) control means for comparing an image signal with a threshold value of the dither matrix, said image density signal representing a density of each pixel of an image to be formed, and for controlling light emission of said exposure means on the basis of a result of the comparison;
(f) a development device which develops the electrostatic latent image formed on said photoconductor layer to form a toner image;
(g) read means for reading code information put on a support member of said photoconductor layer; and
(h) change means for changing threshold value data of the dither matrix in correspondence with the code information read by said read means.

9. An apparatus according to claim 8, wherein said control means controls light emission by changing an intensity of light for exposure by said exposure means.

10. An apparatus for forming an image comprising:
(a) a chargeable photoconductor layer having a support member;
(b) a charger which sensitizes said photoconductor layer to a desired initial electric potential;
(c) conversion means for converting a digital signal to an analog signal, said digital signal representing a density of each pixel of an image to be formed;
(d) exposure means for exposing said photoconductor layer sensitized to the initial electric potential to a quantity of light in correspondence with said analog signal, to form an electrostatic latent image;
(e) supply means for supplying a driving electric voltage to said exposure means;
(f) a development device which develops said electrostatic latent image formed on said photoconductor layer to form a toner image;
(g) read means for reading code information put on a support member of said photoconductor layer; and (h) change means for changing the driving electric voltage of said exposure means supplied by said supply means in correspondence with the code information read by said read means.

11. An apparatus according to claim 10, wherein said exposure means emits light at an intensity in correspondence with said analog signal.

12. A method for forming a half-tone image using an electrophotographic process by controlling the exposure of a photoconductor according to an image density, comprising the steps of:

assigning a code indicating a degree of broadening of an electrostatic latent image relative to a size of a laser beam used to expose the photoconductor;

determining a maximum quantity of light for exposure for each value of the code, which maximum quantity of light is most appropriate for correcting a gamma characteristic of an image to be reproduced by using the maximum quantity of light;

inputting the code;

selecting the maximum quantity of light corresponding to the input code; and forming an electrostatic latent image using the laser beam with varying quantities of light according to the image density, wherein a maximum of the varying quantities is the selected maximum quantity.

13. A method according to claim 12, further comprising the steps of:

controlling a gradation of an image using a pulse width modulation method, and controlling a quantity of light by changing the light-emitting time while keeping the light intensity constant.

14. A method according to claim 12, wherein a gradation of an image is controlled by varying a light intensity while keeping a light-emitting time constant.

15. A method according to claim 12, wherein said inputting step further comprises the step of reading said code.

16. A method according to claim 15, wherein said code is set read from said photoconductor.

17. A method according to claim 12, wherein said inputting step further comprises the step of measuring a value of a surface electric potential of a standard pattern formed on the photoconductor.

18. A method for forming a half-tone image using an electrophotographic process by controlling an exposure of a photoconductor according to an image density, comprising the steps of:

assigning a code indicating a degree of broadening of an electrostatic latent image relative to a size of a laser beam used to exposed the photoconductor;

determining a transformation table for a gamma correction for each value of the code, said transformation table being most appropriate for correcting a gamma characteristic of an image;

inputting the code;

selecting a transformation table corresponding to the input code; and forming an electrostatic latent image with a laser beam using the selected transformation table.

19. A method according to claim 18, further comprising the steps of:

controlling a gradation of an image using a pulse width modulation method, and controlling a quantity of light of the laser beam by changing a light-emitting time while by keeping a light intensity constant.

20. A method according to claim 18, further comprising the steps of:
controlling a gradation of a image by changing a light intensity while keeping a light-emitting time constant.

21. A method according to claim 18, wherein said inputting step further comprises the step of reading said code.

22. A method according to claim 21, wherein said code is read from said photoconductor.

23. A method according to claim 18, wherein said inputting step further comprises the step of measuring a value of the surface electric potential of a standard pattern formed on the photoconductor.

24. A method for forming a half-tone image using an electrophotographic process by controlling an exposure of a photoconductor according to an image density, comprising the steps of:
assigning a code indicating a degree of broadening of an electrostatic latent image relative to a size of a laser beam used to expose the photoconductor;
determining a dither pattern intensity for each value of the code, said dither pattern being appropriate for correcting a gamma characteristic of an image;
inputting the code;
selecting a dither pattern corresponding to the input code; and
forming an electrostatic latent image with a laser beam using the selected dither pattern.

25. A method according to claim 24, further comprising the steps of:
controlling a gradation of an image with use of the using a pulse width modulation method, and controlling a light-emitting time of said laser beam while keeping a light intensity constant.

26. A method according to claim 24, further comprising the step of:
controlling a gradation of an image by changing a light intensity while keeping a light-emitting time constant.

27. A method according to claim 24, wherein said inputting step further comprises the step of reading said code.

28. A method according to claim 27, wherein said code is read from said photoconductor.

29. A method according to claim 24, wherein said inputting step further comprises the step of measuring a value of the surface electric potential of a standard pattern formed on the photoconductor.

30. A method for forming a half-tone image using an electrophotographic process by controlling an irradiation of a photoconductor by a laser beam generated from a laser head according to an image density, comprising the steps of:
assigning a code indicating a size of the laser beam used to expose the photoconductor;
determining a maximum quantity of light for exposure for each value of the code, said maximum quantity of light being appropriate for correcting a gamma characteristic of an image to be reproduced using the maximum quantity of light;
inputting the code;
selecting the maximum quantity of light corresponding to the input code; and
forming an electrostatic latent image with the laser beam using varying quantities of light according to the image density, wherein a maximum of the varying quantities is the selected maximum quantity.

31. A method according to claim 30, wherein said inputting step further comprises the step of reading said code.

32. A method according to claim 31, wherein said code is read from said laser head.

33. A method for forming a digital half-tone image using a electrophotographic process by controlling an irradiation of a photoconductor by a laser beam generated from a laser head according to an image density, comprising the steps of:
assigning a code indicating a size to the laser beam used to expose the photoconductor;
determining a transformation table for gamma correction for each value of the code, said transformation table being appropriate for correcting a gamma characteristic of an image;
inputting the code;
selecting a transformation table corresponding to the input code; and
forming an electrostatic latent image with the laser beam using the selected transformation table.

34. A method according to claim 33, wherein said inputting step further comprises the step of reading said code.

35. A method according to claim 34, wherein said code is read from said laser head.

36. A method for forming a half-tone image using an electrophotographic process by controlling an irradiation of a photoconductor by a laser beam generated from a laser head according to an image density, comprising the steps of:
assigning a code indicating a size of the laser beam used to expose the photoconductor;
determining a dither pattern for each value of the code, said dither pattern is appropriate for correcting a gamma characteristic of an image;
inputting the code;
selecting a dither pattern corresponding to the input code; and
forming an electrostatic latent image with a laser beam using the selected dither pattern.

37. A method according to claim 36, wherein said inputting step further comprises the step of reading said code.

38. A method according to claim 37, wherein said code is read from said laser head.

39. A method for forming a half-tone image using an electrophotographic process by controlling an irradiation of a photoconductor by a laser beam for exposing a photoconductor according to an image density, comprising the steps of:
assigning a first code indicating a degree of broadening of an electrostatic latent image relative to a laser beam used to expose the photoconductor;
assigning a second code indicating a size of the laser beam used to expose the photoconductor;
determining a maximum quantity of light for exposure for each combination of values of the two codes, said maximum quantity of light is most appropriate for correcting a gamma characteristic of an image to be reproduced by using the maximum quantity of light;
inputting the first code;
inputting the second code;
selecting the maximum laser intensity corresponding to a combination of the first and second input codes; and forming an electrostatic latent image with a laser beam using varying quantities of light wherein a maximum of the varying quantities is the selected maximum quantity.

40. A method according to claim 39, further comprising the steps of:
controlling a gradation of an image using a pulse width modulation method, and
controlling a quantity of light by changing the light-emitting time of the laser beam while keeping the light intensity constant.

41. A method according to claim 39, wherein a gradation of an image is controlled by varying a light intensity of the laser beam while keeping a light-emitting time constant.

42. A method according to claim 39, wherein said first and second code inputting steps each comprise the step of reading said first and second codes.

43. A method according to claim 42, wherein said first code is read from said photoconductor and said second code is read from said laser head.

44. A method according to claim 39, wherein said step of inputting said first code comprises the step of measuring a value of a surface electric potential of a standard pattern formed on the photoconductor.

45. A method for forming a half-tone image using an electrophotographic process by controlling an irradiation of laser beam generated from a laser head for exposing a photoconductor according to an image density, comprising the steps of;
assigning a first code indicating a degree of broadening of an electrostatic latent image relative to a size of the laser beam used to expose the photoconductor;
assigning a second code indicating a size of the laser beam used to expose the photoconductor;
determining a transformation table for gamma correction for each combination of values of the first and second codes, said transformation table is most appropriate for correcting the gamma characteristic;
inputting the first code;
inputting the second code;
selecting a transformation table corresponding to a combination of the first and second input codes; and
forming an electrostatic latent image with a laser beam using the selected transformation table.

46. A method according to claim 45, further comprising the steps of:
controlling a gradation of an image using a pulse width modulation method, and
controlling a quantity of light by changing a light-emitting time of said laser beam while keeping a light intensity constant.

47. A method according to claim 45, wherein a gradation of an image is controlled by varying a light intensity of said laser beam while keeping a light-emitting time constant.

48. A method according to claim 45, wherein said first and second code inputting steps each comprise the step of reading said first and second codes.

49. A method according to claim 48, wherein said first code is read from said photoconductor and said second code is read from said laser head.

50. A method according to claim 45, wherein said step of inputting said first code comprises the step of measuring a value of a surface electric potential of a standard pattern formed on the photoconductor.

51. A method for forming a half-tone image using an electrophotographic process by controlling an irradiation of a laser beam generated by a laser head for exposing a photoconductor according to an image density, comprising the step of:
assigning a first code indicating a degree of broadening of an electrostatic latent image relative to a size of a laser beam used to expose a photoconductor;
assigning a second code indicating a size of the laser beam to used expose the photoconductor;
determining a dither pattern for each combination of values of the first and second codes, which dither pattern is most appropriate for correcting a gamma characteristic of an image;
inputting the first code;
inputting the second code;
selecting a dither pattern corresponding to a combination of the first and second input codes; and
forming an electrostatic latent image with a laser beam using the selected dither pattern.

52. A method according to claim 51, further comprising the steps of:
controlling a gradation of an image using a pulse width modulation method, and
controlling a quantity of light by changing a light-emitting time of said laser beam while keeping a light intensity constant.

53. A method according to claim 51, wherein a gradation of an image is controlled by varying a light intensity of said laser beam while keeping a light-emitting time constant.

54. A method according to claim 51, wherein said first and second code inputting steps comprise the step of reading said first and second codes.

55. A method according to claim 54, wherein said first code is read from said photoconductor and said second code is read from said laser head.

56. A method according to claim 51, wherein said step of inputting said first code comprises the step of measuring a value of a surface electric potential of a standard pattern formed on the photoconductor.

57. A method for forming a half-tone image using an electrophotographic process by controlling an exposure of a photoconductor according to an image density, comprising the steps of:
detecting a degree of broadening of an electrostatic latent image relative to a size of a laser beam used to expose the photoconductor;
deciding if the detected degree of broadening is larger than a predetermined standard value representing a criterion of deterioration of the photoconductor, and
requesting exchange of the photoconductor if it is decided that the detected exceeds the predetermined standard value.

* * * * *